(12) United States Patent
Janssen et al.

(10) Patent No.: US 11,521,062 B2
(45) Date of Patent: Dec. 6, 2022

(54) NEURAL NETWORK TRAINING USING A DATA FLOW GRAPH AND DYNAMIC MEMORY MANAGEMENT

(71) Applicant: INTERNATIONAL BUSINESS MACHINES CORPORATION, Armonk, NY (US)

(72) Inventors: Gradus Janssen, Putnam Valley, NY (US); Vladimir Zolotov, Putnam Valley, NY (US); Tung D. Le, Ichikawa (JP)

(73) Assignee: International Business Machines Corporation, Armonk, NY (US)

( * ) Notice: Subject to any disclaimer, the term of this patent is extended or adjusted under 35 U.S.C. 154(b) by 407 days.

(21) Appl. No.: 16/704,240

(22) Filed: Dec. 5, 2019

(65) Prior Publication Data

US 2021/0174190 A1 Jun. 10, 2021

(51) Int. Cl.
*G06F 9/455* (2018.01)
*G06N 3/04* (2006.01)
(Continued)

(52) U.S. Cl.
CPC .............. *G06N 3/08* (2013.01); *G06F 9/5016* (2013.01); *G06F 9/5022* (2013.01);
(Continued)

(58) Field of Classification Search
CPC .. G06N 3/08; G06N 3/04; G06N 3/06; G06N 3/0454; G06N 3/02; G06N 20/00; G06F 9/5016; G06F 9/5022; G06K 9/6256
See application file for complete search history.

(56) References Cited

U.S. PATENT DOCUMENTS

| 7,747,070 B2 | 6/2010 | Puri |
| 8,938,696 B1 | 1/2015 | Torunoglu et al. |

(Continued)

FOREIGN PATENT DOCUMENTS

| CN | 105573717 A | 5/2016 |
| CN | 107402745 A | 11/2017 |

(Continued)

OTHER PUBLICATIONS

Cheng Luo et al., RNA: An Accurate Residual Network Accelerator for Quantized and Reconstructed Deep Neural Networks, May 2019, [Retrieved on Aug. 15, 2022]. Retrieved from the internet: <URL: https://www.jstage.jst.go.jp/article/transinf/E102.D/5/E102. D_2018RCP0008/_pdf/-char/ja> 9 Pages (1037-1045) (Year: 2019).*
(Continued)

*Primary Examiner* — Anibal Rivera
(74) *Attorney, Agent, or Firm* — Elliot J. Shine

(57) ABSTRACT

Processing a neural network data flow graph having a set of nodes and a set of edges. An insertion point is determined for a memory reduction or memory restoration operation. The determination is based on computing tensor timing slacks (TTS) for a set of input tensors; compiling a candidate list (SI) of input tensors, from the set of input tensors, using input tensors having corresponding TTS values larger than a threshold value (thTTS); filtering the SI to retain input tensors whose size meets a threshold value (thS); and determining an insertion point for the operation using the SI based on the filtering. A new data flow graph is generated or an existing one is modified using this process.

23 Claims, 14 Drawing Sheets

(51) Int. Cl.
G06N 3/063 (2006.01)
G06N 3/08 (2006.01)
G06F 9/50 (2006.01)
G06K 9/62 (2022.01)
G06N 3/06 (2006.01)
G06N 3/02 (2006.01)

(52) U.S. Cl.
CPC ............ *G06K 9/6256* (2013.01); *G06N 3/04* (2013.01); *G06N 3/06* (2013.01); *G06N 3/02* (2013.01); *G06N 3/0454* (2013.01)

(56) References Cited

U.S. PATENT DOCUMENTS

| | | | |
|---|---|---|---|
| 10,127,696 | B2 | 11/2018 | Wright et al. |
| 2017/0032487 | A1 | 2/2017 | Ashari et al. |
| 2018/0247196 | A1 | 8/2018 | Barham |
| 2018/0293777 | A1 | 10/2018 | Sarel |
| 2019/0205737 | A1* | 7/2019 | Bleiweiss .............. G06N 20/00 |
| 2020/0174707 | A1* | 6/2020 | Johnson ................ G06F 3/0673 |
| 2021/0019184 | A1* | 1/2021 | Vee ...................... G06F 16/9024 |
| 2021/0142178 | A1* | 5/2021 | Shi .......................... G06F 12/08 |
| 2021/0150770 | A1* | 5/2021 | Appu ................... G06N 3/0445 |

FOREIGN PATENT DOCUMENTS

| | | |
|---|---|---|
| CN | 114746871 A | 7/2022 |
| GB | 2605100 A | 9/2022 |
| WO | 2021111332 A1 | 6/2021 |

OTHER PUBLICATIONS

Cho et al., "Large Model Support for Deep Learning in Caffe and Chainer", 2018 Association for Computing Machinery, 2 pages.
Gruslys et al., "Memory-Efficient Backpropagation Through Time, arXiv:1606.03401v1, Jun. 10, 2016, 14 pages.
Disclosed Anonymously, "Distribution of Correlated Streams of Data in a Massively Parallel Dataflow Graph", an IP.com Prior Art Database Technical Disclosure, IP.com No. IPCOM000239625D, Publication Date: Nov. 20, 2014, 4 pages.
Disclosed Anonymously, "Fast Simulation with Multiple Multi-Layer Neural Networks", an IP.com Prior Art Database Technical Disclosure, IP.com No. IPCOM000247603D, Publication Date: Sep. 19, 2016, 6 pages.
Disclosed Anonymously, "Identifying Sources of a Change in Metrics of a Stack of Servers", an IP.com Prior Art Database Technical Disclosure, IP.com No. IPCOM000252099D, Publication Date: Dec. 15, 2017, 34 pages.
Wongsuphasawat et al., "Visualizing Dataflow Graphs of Deep Learning Models in TensorFlow", IEEE Transactions on Visualization and Computer Graphics, pp. (99):1-1, Aug. 2017, 12 pages.
Le et al., "TFLMS: Large Model Support in TensorFlow by Graph Rewriting", arXiv:1807.02037v1, Jul. 5, 2018, 10 pages.
Meng et al., "Training Deeper Models by GPU Memory Optimization on TensorFlow", 31st Conference on Neural Information Processing Systems, (NIPS 2017), 8 pages.
Wang et al., "Supporting Very Large Models Using Automatic Dataflow Graph Partitioning", arXiv:1807.08887v1, Jul. 24, 2018, 17 pages.
Vokorokos et al., "Flexible Platform for Neural Network Based on Data Flow Principles", Published 2005, 12 pages.
Cicek et al., "3d U-Net: Learning Dense Volumetric Segmentation from Sparse Annotation", In Proceedings of International Conference on Medical Image Computing and Computer-Assisted Intervention, pp. 424-432, Oct. 2016.
He et al., "Deep Residual Learning for Image Recognition", In Proceedings of 2016 IEEE Conference on Computer Vision and Pattern Recognition, pp. 770-778, 2016.
Wu et al., "Google's Neural Machine Translation System: Bridging the Gap Between Human and Machine Translation", arXiv:1609.08144v2, Oct. 8, 2016, pp. 1 23.
Krizhevsky, "One weird trick for parallelizing convolutional neural networks", arXiv:1404.5997v2, Apr. 26, 2014, pp. 1-7.
Chen et al., "Training Deep Nets with Sublinear Memory Cost", arXiv:1604.06174v2, Apr. 22, 2016, pp. 1-12.
Le et al., "Automatic GPU Memory Management for Large Neural Models in TensorFlow", In Proceedings of the 2019 ACM SIGPLAN International Symposium on Memory Management, ISMM 2019, pp. 1-13, New York, NY, USA, 2019, ACM.
Jia et al., "Caffe: Convolutional Architecture for Fast Feature Embedding", arXiv:1408.5093v1, Jun. 20, 2014, 4 pages.
Abadi et al., "TensorFlow: A System for Large-Scale Machine Learning", In Proceedings of the 12th USENIX Conference on Operating Systems Design and Implementation, pp. 265-283, Nov. 2016.
Graves et al., "Neural Turing Machines", arXiv:1410.5401v2, Dec. 10, 2014, pp. 1-26.
Hitchcock, Sr. et al., "Timing Analysis of Computer Hardware", IBM Journal of Research and Development, vol. 26, No. 1, pp. 100-105, Jan. 1982.
Caldeira et al., IBM Power System S882LC for High Performance Computing, Introduction and Technical Dverview, IBM Redbooks, Oct. 2016, 82 pages.
Caldeira, "IBM Power System AC992, Introduction and Technical Overview", IBM Redbooks, Mar. 2018, 74 pages.
International Searching Authority, "Notification of Transmittal of the international Search Report and the Written Opinion of the International Searching Authority, or Declaration," Patent Cooperation Treaty, Date, 9 pages, International Application No. PCT/IB2020/061386.
Janssen, et al., "Neural Network Training Using a Data Flow Graph and Dynamic Memory Management," Application and Drawings, Filed on Date, 55 Pages, Related PCT Patent Application Serial No. PCT/IB2020/061386.
Intellectual Property Office, "Examination Report under Section 18(3)," Patent Cooperation Treaty, dated Aug. 11, 2022, 6 pages, International Application No. GB2208863.7.
Gradus et al., "Neural Network Training Using a Data Flow Graph and Dynamic Memory Management", IBM Docket No. P201806498DE01, Application No. 112020006010.1, Application and Drawings: 55 Pages, Filed Dec. 2, 2020.

* cited by examiner

NEURAL NETWORK TRAINING USING A DATA FLOW GRAPH AND DYNAMIC MEMORY MANAGEMENT

BACKGROUND

The present invention relates generally to processing large machine learning and neural network models in an environment with limited memory capacity. More particularly, the present invention relates to modifications to the computational data flow graph that would reduce its memory footprint, i.e., less memory is needed during an evaluation of the graph and hence a larger graph or larger data samples (or more samples at one time) can be handled.

A neural network is an artificial neural network (ANN) modeled after the functioning of the human brain, with weighted connections among its nodes, or "neurons." A deep neural network (DNN) is an artificial neural network with multiple "hidden" layers between its input and output layers. The hidden layers of a DNN allow it to model complex nonlinear relationships featuring higher abstract representations of data, with each hidden layer determining a nonlinear transformation of a prior layer. Training of large deep neural networks is a challenging computational problem. Only the introduction of graphical processors (GPUs) with their fantastic performance allowed one to move from recognizing hand-written digits (MNIST) and tiny pictures (CIFAR 10) to classifying high resolution images (ImageNet). A key factor of GPU computational performance is its high speed memory. Unfortunately, GPU memory is much smaller than the main memory (CPU memory) of the computer. The size of a graphical processor (GPU) memory limits both the depth of the DNN and the size of the data samples. As a result, there is often a constraint on image size and resolution, which in turn affects the accuracy of the DNN. Memory constraints can be lightened by reducing the memory occupied by the data. In illustrative embodiments, the GPU can send data in its memory to the CPU to free up additional memory space, and then retrieve the data from the CPU after using the additional memory space for its intended function.

SUMMARY

Embodiments of the present invention provide methods, systems, and computer program products for reducing overall GPU memory usage while processing neural networks, by automatically determining insertion points of memory conservation operations in an underlying data flow graph comprising a set of nodes and a set of edges.

In an embodiment, a method for reducing overall GPU memory usage, as described above, computes tensor timing slacks (TTS) for a set of input tensors, compiles a candidate list (SI) of input tensors, from the set of input tensors, using input tensors having corresponding TTS values larger than a threshold value (thTTS), filters the SI to retain input tensors whose size meets a threshold value (thS), and determines an insertion point for the operation using the SI based on the filtering.

In an embodiment, the operation is a combination of a reduction operation and a restoration operation, wherein the reduction operation comprises either or both of a copy to central processing unit (CPU) memory operation and a compression operation, and wherein the restoration operation comprises either or both of a copy from CPU memory operation and a decompression operation.

In an embodiment, computing the TTS comprises performing timing analysis using the input tensors.

In an embodiment, the timing analysis comprise initializing tensor arrival time (TAT), tensor required time (TRT), and tensor timing slack (TTS) values for the input tensors; for a set of input tensors Q, while Q is not empty, performing steps of:
  selecting a node q in Q for exclusion;
  excluding q from Q; and
  setting, for each successor input tensor s of q, the TAT of s to be equal to TAT of q.

In an embodiment the initializing comprises initializing TAT, TRT, and TTS values to be of unknown value or to be zero.

In an embodiment, all inputs of a node n have a known TAT value, wherein n is a node for which s is an input tensor, and wherein the method further comprises performing, for the set of input tensors Q, further steps of:
  setting the TRT of n to be a maximum of the TATs of inputs s of n;
  setting the TTS of each input i of n as a difference of n's TRT and the TAT of s;
  setting the TAT of n based on n's TRT incremented by a node delay; and
  including n back into Q.

In an embodiment, the data flow graph comprises a pair (N, E), wherein N comprises a set of nodes and E comprises a set of hyperedges, and wherein a given node in N implements one or more operators on one or more tensors.

In an embodiment, the given node comprises a triplet (f, I, O), wherein f is a function of an operator implemented by the given node, I is a set of input tensors of the given node, and O is a set of outputs of the given node generated based on the operator.

In an embodiment, a hyperedge defines how a tensor is passed from an operator that generates the tensor, to an operator that uses the tensor as an argument.

In an embodiment, a hyperedge comprises a pair (s, H), wherein s is a node output, and H is a set of node inputs.

In an embodiment, the method further comprises: inserting in the data flow graph a subgraph node corresponding to the operation.

In an embodiment, the inserting generates a new data flow graph or modifies an existing data flow graph.

In an embodiment, the inserting generates a new data flow graph, wherein the new data flow graph comprises a complete data flow graph or a partial data flow graph.

In an embodiment, the method further comprises:
  processing the set of input tensors using the data flow graph based on the inserting; and
  generating outputs based on the processing.

In an embodiment, the operation is a memory reduction operation, and the method further comprises inserting a memory reduction subgraph node corresponding to the memory reduction operation.

In an embodiment, the inserting further comprises:
  connecting, via a first hyperedge, a first node to the memory reduction subgraph node, the first node corresponding to a source node; and
  connecting, via a second hyperedge, the memory reduction subgraph node to the second node, wherein the second hyperedge comprises a serialization hyperedge and the second node corresponds to an intermediary node or to a destination node.

In an embodiment, the inserting further comprises:
  connecting, via a third hyperedge, the first node to a second node.

In an embodiment, the operation is a memory restoration operation, and the method further comprises:

inserting a memory restoration subgraph node corresponding to the memory restoration operation.

In an embodiment, the inserting further comprises:

connecting, via a first hyperedge, a first node to the memory restoration subgraph node, wherein the second hyperedge comprises a serialization hyperedge or a prefetching hyperedge;

connecting, via a second hyperedge, the memory restoration subgraph node to a second node, the second node corresponding to a destination node; and connecting, via a third hyperedge, a memory reduction subgraph node to the memory restoration subgraph node.

In an embodiment, the method further comprises connecting two nodes of the data flow graph via a hyperedge, wherein the connecting comprises either of:

a direct connection via the hyperedge between the two nodes; and an indirect connection via one or more additional nodes and hyperedges between the two nodes.

In an embodiment, steps of the method are performed iteratively to insert into the flow graph a set of subgraph nodes for performing at least one memory reduction operation and at least one memory restoration operation.

In an embodiment, performing steps of the method iteratively comprises inserting a set of hyperedges in the flow graph, the set of hyperedges comprising at least one serialization hyperedge, or at least one prefetching hyperedge, or at least one serialization hyperedge and at least one prefetching hyperedge.

In an embodiment, the method described above is stored as programming instructions stored on one or more tangible storage media of one or more computer systems and performed by one or more processors of the one or more computer systems executing the programming instructions. The programming instructions may be stored as a computer programming product.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
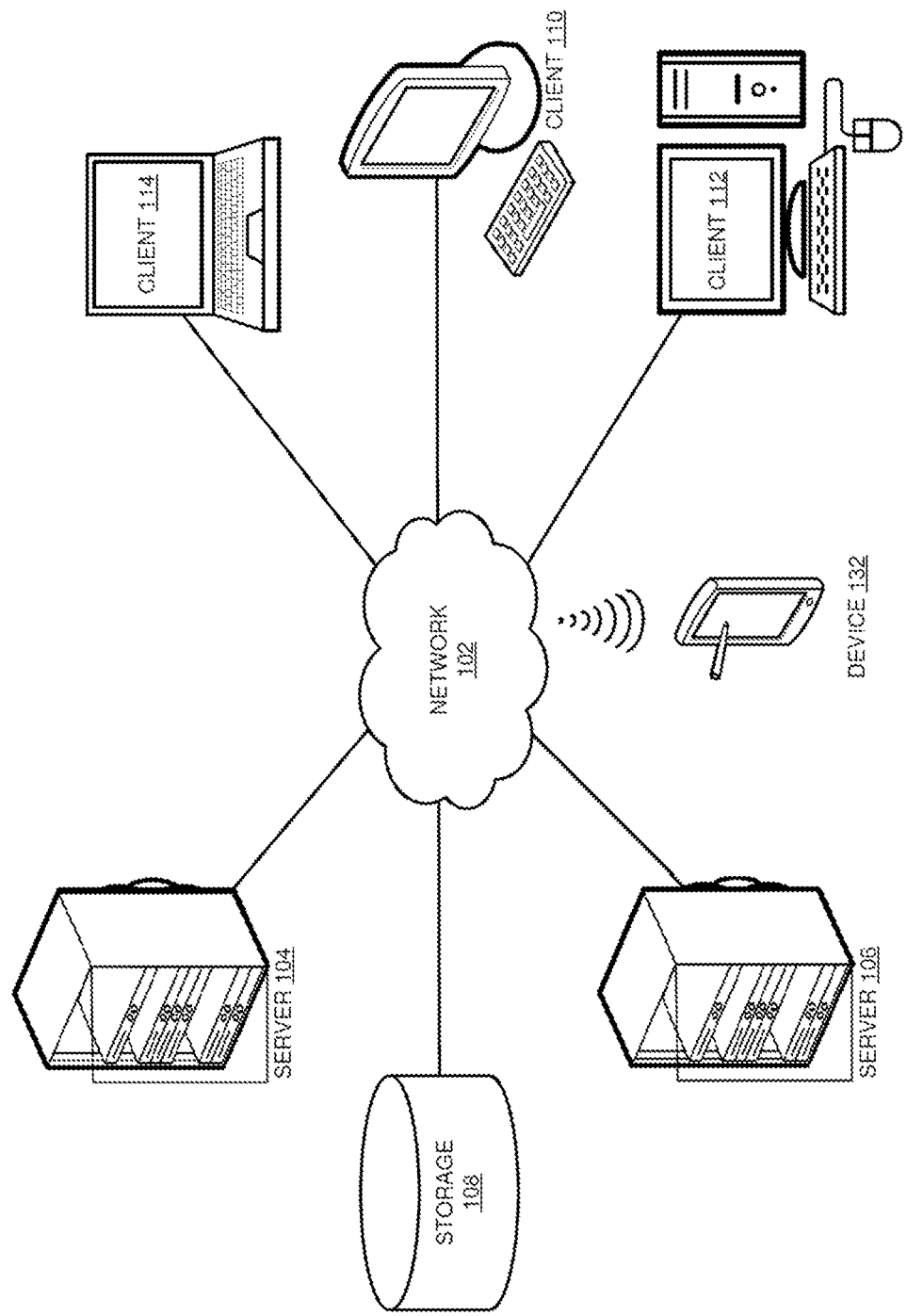
FIG. 1 depicts a block diagram of a network of data processing systems in which illustrative embodiments may be implemented.

A GPU only has a certain memory space with which to compute computations or perform various functions. The illustrative embodiments recognize that a GPU can efficiently move data to a CPU or compress its own data to free up the additional memory space required to perform the computations and/or functions. A swap-out node moves its input tensor from the GPU to a CPU. A swap-in node moves data back from the CPU to the GPU. The data restoration to the GPU is delayed until the data is needed for further computations.

The illustrative embodiments recognize that serialization together with tensor swapping can minimize GPU memory requirements. Tensor swapping and data compression are used for reduction. As a GPU compresses data much faster than it transfers the data to the CPU, data compression significantly reduces the computation time. Application of data compression alone can save memory space with minimal run time being lost. Compression of tensors to be swapped can reduce time lost due to data transfer.

The illustrative embodiments depict how memory reduction is improved by proper serialization of data flow. The illustrative embodiments recognize that a data flow graph with memory management is an efficient technique for training deep neural networks. The data flow graph illustrates the tensor flow or data flow that occurs from the GPU to the CPU and data flow that occurs from one data node to another data node within nodes of the data processing system. The memory management refers to the GPU being able to efficiently free up additional memory space. Typically, a data flow graph has computational nodes that take input data and produce output data. The GPU is responsible for timely allocation and de-allocation of these tensors or data. However the scarcity of the GPU memory can put a severe limit on the size of the data flow graph and the corresponding tensors.

The illustrative embodiments depict how a GPU can free up additional memory space by transferring data to a CPU. However, a problem with data swapping between a GPU and CPU, in which the GPU transfers some of its data to the CPU to free up additional memory space, is how to perform this process in a timely manner as data is flowing within the data processing system and being transmitted through various nodes. Swapping large amounts of data from the GPU to the CPU can be time-consuming. A swap-out node moves data or an input tensor from a GPU to a CPU memory. A swap-in node moves the data or input tensor back to the GPU memory during memory restoration. Accordingly, large data flow graphs can be executed with a limited GPU memory.

Tensor swapping between the GPU and the CPU and data compression can be effectively used to free up the additional memory space needed to execute the large data flow graph. The illustrative embodiments recognize that the more tensors that are involved in memory conservation, the higher the memory savings and the bigger data flow graph can be processed in the GPU memory because of the additional memory space available in the GPU. Further, the GPU can also decide to transfer a greater number of smaller or mid-size tensors to free up the memory space that can be less time consuming than moving large sized data to a CPU.

The illustrative embodiments recognize that the process of memory reduction can be improved by a proper serialization and prefetching of data flow graph execution. The memory requirements of the GPU are significantly reduced as a result of the tensor swapping with the CPU. With prefetching, the data restoration to the GPU can be delayed until the data is actually needed.

The illustrative embodiments recognize that data transfer from one device to another such as from a GPU to a CPU and vice versa can take significant time. In an embodiment, since memory conservation incurs time for data transfer, compression and decompression (the term decompress and its other forms are used interchangeably with uncompress and its other forms), it should only be applied to tensors that occupy GPU memory for a sufficiently long time without participation in any computations. Accordingly, the GPU can transfer data (tensors) to the CPU and receive the same data from the CPU that are not involved in computations or functions. Through serialization, an additional structure modification can be added to the data flow graph in the form of control dependency edges as opposed to regular data transmission edges. The GPU can swap or transfer tensors (data) to the CPU to free up the additional memory space needed to perform a series of functions or computations.

In illustrative embodiments, memory restoration can be delayed. An additional structural modification can be added to the data flow graph in the form of control dependency edges. The GPU can reclaim the data that it had originally transferred to the CPU to perform the functions and/or computation. A node can apply a control dependency edge onto a subgraph node(s) to delay memory restoration until the node has completed its execution.

In illustrative embodiments, the GPU can also decide to not swap tensors with the CPU or another device. Instead, the GPU can decide to compress its tensors internally to free up the additional memory space. Serialization enables the GPU time to begin to compress the data to free up the additional memory space, before allowing data transfer between the nodes to resume. Prefetching can enable the GPU to delay decompressing the data to allow nodes to transmit their data before the GPU decompresses the compressed data.

The illustrative embodiments provide memory reduction and memory restoration actions that can allow the GPU to transfer data to a CPU to free up additional memory space to perform computations and/or functions, and then reacquire its data from the CPU after the additional memory space has been used. The illustrative embodiments also provide a program product and computer system including the memory reduction and memory restoration described above to transfer data to the CPU to free up additional memory space, and then reacquire the data from the CPU after the additional memory space has been used.

The illustrative embodiments used to describe the invention generally address and solve the above-described problem of memory management in a GPU within a data processing system in deep learning systems. The illustrative embodiments provide a method, computer program product, and computer system for memory management in a GPU in deep learning systems.

In an embodiment, timing analysis computes time moments of the events occurring in a data flow graph during its execution. Time is a criterion for selecting tensors (data) for memory reduction. The timing analysis also assumes that the computation of the data at all outputs of a given node are completed at the same time.

The timing quantities used in the timing analysis include tensor arrival time (TAT), tensor required time (TRT), and tensor timing slack (slack time). The TAT is time when the computation of data is completed, and the data is available for operators/nodes. The TRT is the time when the data at an input of a node is required for execution of the node. The TTS is the difference between the TRT and the TAT.

The timing analysis algorithm begins by initializing the TATs, TRTs, and the TTSs in the data flow graph to be unknown. The TAT, and TRT and TTS=0 for each source node of the data flow graph. An arbitrary node can be selected from the data flow graph to perform the timing analysis involving the TAT, TRT, and TTS.

Some basic criteria for selecting candidate tensors for memory conservation can include the size of the tensor, the tensor timing slack, and the total number of tensors. Small tensors may not be the best candidates for data swapping. In contrast, a bigger tensor timing slack can remain in CPU memory or in a compressed state longer. Further, the greater number of tensors involved in memory conservation can free more GPU memory for other computations.

In illustrative embodiments, timing analysis can be used to identify one or more nodes in a data flow group. The one or more nodes which produce output data with the greatest memory requirement among the nodes in the data flow graph can be identified. Structural modifiers such as a "SERIALIZATION" and "PREFETCH" can be inserted to the one or more nodes within the data flow graph. The serialization of data flow graph nodes is performed by defining a control dependency of one node on another node. Execution of node B does not start before execution of node A is fully completed. It means no output tensors of node B are allocated before the execution of node A is completed. Prefetching is performed by invoking a control dependency edge from one node onto another node to delay tensor reconstruction or memory restoration. The node which applies the control dependency edge completes its execution before the tensor reconstruction or memory restoration takes place.

An embodiment provides a method for memory management within a GPU by the GPU transferring data to a CPU to free up additional memory space to perform one or more functions or computations. The method also includes memory restoration wherein the CPU can return the restore data back to the GPU. Another embodiment provides computer program product with program instructions for the GPU to transfer data to a CPU to free up additional memory space. The computer program product also includes program instructions including memory restoration to allow the GPU to receive the data back from the CPU. Another embodiment provides a computer system with program instructions for the GPU to transfer data to a CPU. The computer system also includes program instructions to use memory restoration to transfer the data back to the GPU.

Completion times refer to the time when the computation of the tensor or data is completed at the node, and available for the other nodes. According to one definition, slack times refer to the amount of time that the arrival of a certain input could be delayed without causing the whole operation to be delayed, or how long the tensor is waiting at the input of the node until the tensor is used for the computation.

In an embodiment, the addition of a memory device such as a GPU is introduced in a data processing system in which nodes are transmitting and receiving data. The GPU attempts to perform functions or calculations that will cause acquisition of additional memory space. To perform the functions or calculations, the GPU decides to move data to a CPU within the data processing system to free up the additional memory space. During memory reduction, a subgraph node(s) applies a control dependency edge to a node to allow the GPU to transmit the data to the CPU and free up additional memory space. The node is a dependent node and the subgraph node(s) is the controlling node during the serialization route. The subgraph node(s) and the node are serialized, wherein the subgraph node(s) performs its execution before the node performs its execution. As the nodes transmit their data to other nodes, another structural modification can be added to the data flow graph to serialize an execution of nodes. Illustrative embodiments can have multiple structural modifications added to the data flow graph, and wherein the GPU performs its execution of transmitting data to a CPU before the node transmits its output data to another node.

As the GPU has finished using the additional memory space for its intended function, the GPU can reacquire the data that it originally transferred to the CPU, and memory restoration can occur. Another node can apply a control dependency edge onto another subgraph node(s). As a result of the control dependency edge being applied, the restored data is delayed from being sent until a destination node that takes the restored data needs the restored data and until the controlling node that applied the control dependency edge has performed its execution. The CPU can transmit the data to be restored to the GPU to the destination node when the node which applied the control dependency edge has completed its execution.

In an embodiment, the GPU can also compress its data by a fraction to provide additional memory space to perform the desired functions or computations without transmitting any data to a CPU. The GPU can compress data from 32 bits to 16 bits to create the additional memory space. In other illustrative embodiments, the GPU can compress its data by a different fraction (i.e., from 32 bits to 24 bits, or from 32 bits to 8 bits). A subgraph node(s) applies a control dependency edge on a node which received data from the source node. The GPU can complete its execution of compressing the data. The node is serialized and transmits its received data after the GPU has finished compressing its data. The control dependency edge can delay the other subgraph node(s) from decompressing the data until the node has completed its execution. The GPU cannot receive the decompressed data until the node that applied the control dependency edge has completed its execution.

As used herein, the term data flow graph may be defined according to one of the following exemplary and non-limiting definitions.

Definition 1: A data flow graph is a pair (N, E) where N is a set of nodes, and E is a set of hyperedges. Nodes implement operators on tensors. Each node is a triplet (f, I, O), where f is the function of the operator implemented by the node, I is a set of the node inputs, corresponding to the operator arguments, and O is a set of the node outputs corresponding to the tensors computed by the operator. Hyperedges define how tensors are passed from operators computing them to operators using them as arguments. Each hyperedge is a pair (s, H), where s is a node output, and H is a set of node inputs. s and H={h1, h2, . . . } are the source and the set of the sinks of the hyperedge respectively. Hypergraphs are different from conventional graphs. An edge of a conventional graph always has one sink. A hyperedge may have several sinks: the same tensor is used as an argument by several operators. A hypergraph node has a more complex structure than a node of a conventional graph. Different operator arguments and results may have different meanings, sizes and dimensions. Therefore the inputs and outputs of a hypergraph node may be identified and uniquely labeled. Nodes of conventional graphs can describe only operators with a single argument and a single result. In addition to defining sources and sinks of hyperedges as node inputs and outputs, it is convenient to talk about source and sink nodes of hyperedges. They are defined as follows.

Definition 2: The nodes corresponding to a hyperedge source and sinks are called source and sink nodes of the hyperedge respectively.

Definition 3: A hyperedge connected to an input of a node is called an incoming hyperedge of that node, and a hyperedge connected to an output of that node is called an outgoing hyperedge of that node.

Definition 4: The successor inputs of a node are the sinks of the outgoing hyperedges of that node.

Definition 5: The successor nodes of a node are the sink nodes of the outgoing hyperedges of that node. Note that we distinguish successor inputs and successor nodes. The former ones are node inputs and the latter are the nodes themselves.

Accordingly, one or more embodiments provide for methods that enable memory management. Various embodiments provide for a methodology that enables memory management in a deep learning system.

For the clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or component that are not shown or described herein, or structures or components different from those shown but for a similar function as described herein may be present without departing the scope of the illustrative embodiments.

Furthermore, the illustrative embodiments are described with respect to specific actual or hypothetical components only as examples. The steps described by the various illustrative embodiments can be adapted using a variety of components that can be purposed or repurposed to provide a described function within a data processing environment, and such adaptions are contemplated within the scope of the illustrative embodiments.

The illustrative embodiments are described with respect to certain types of steps, applications, and data processing environments only as examples. Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
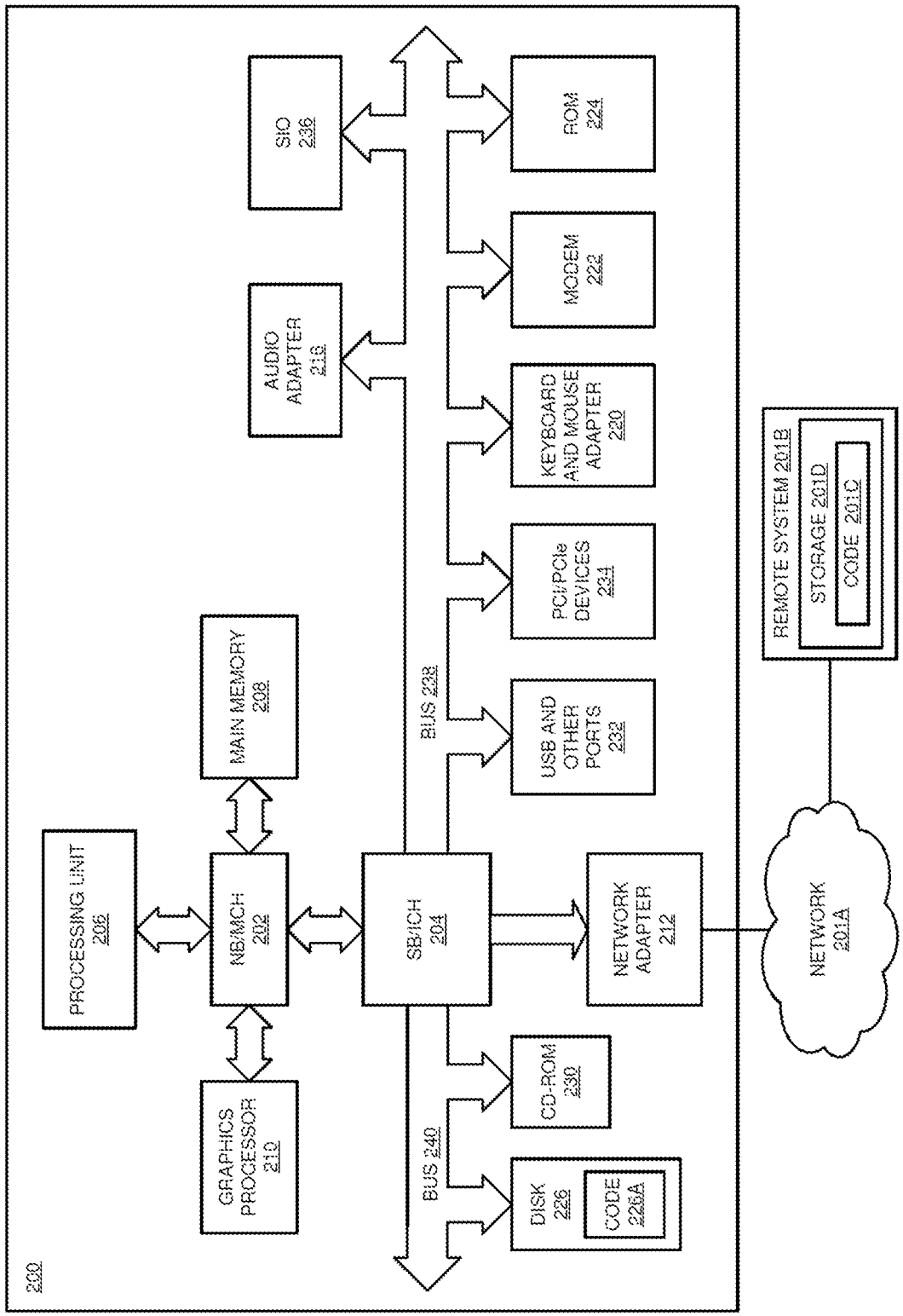
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. A server 104 couples to network 102. Software applications may execute on any quantum data processing system in data processing environment 100. Any software application described as executing in the server 104 in FIG. 1 can be configured to execute in another data processing system in a similar manner. Any data or information stored or produced in server 104 in FIG. 1 can be stored or produced in another data processing system in a similar manner. A classical data processing system, such as the server 104, may contain data and may have software applications or software tools executing classical computing processes thereon.

Server 106 couples to the network 102 along with storage unit 108. Storage unit 108 includes is configured to store neural network training data as described herein with respect to various embodiments. Server 106 is a conventional data processing system. Software applications may execute on any quantum data processing system in data processing environment 100. Any software application described can be configured to execute in another data processing system in a similar manner.

Clients 110, 112, and 114 are also coupled to network 102. A conventional data processing system, such as server 106, or client 110, 112, or 114 may contain data and may have software applications or software tools executing conventional computing processes thereon.

Only as an example, and without implying any limitation to such architecture, FIG. 1 depicts certain components that are usable in an example implementation of an embodiment. For example, server 106, and clients 110, 112, 114, are depicted as servers and clients only as example and not to imply a limitation to a client-server architecture. As another example, an embodiment can be distributed across several conventional data processing systems, quantum data processing systems, and a data network as shown, whereas another embodiment can be implemented on a single conventional data processing system or single quantum data processing system within the scope of the illustrative embodiments. Conventional data processing systems 106, 110, 112, and 114 also represent example nodes in a cluster, partitions, and other configurations suitable for implementing an embodiment.

Device 132 is an example of a conventional computing device described herein. For example, device 132 can take the form of a smartphone, a tablet computer, a laptop computer, client 110 in a stationary or a portable form, a wearable computing device, or any other suitable device. Any software application described as executing in another conventional data processing system in FIG. 1 can be configured to execute in device 132 in a similar manner. Any data or information stored or produced in another conventional data processing system in FIG. 1 can be configured to be stored or produced in device 132 in a similar manner.

Server 106, storage unit 108, classical processing system 104, quantum processing system 140, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 106 may provide data, such as boot files, operating system images, and applications to clients 110, 112, and 114. Clients 110, 112, and 114 may be clients to server 106 in this example. Clients 110, 112, 114, or some combination thereof, may include their own data, boot files, operating system images, and applications. Data processing environment 100 may include additional servers, clients, and other devices that are not shown.

The data processing environment 100 may include additional memories, quantum processors, and other devices that are not shown. In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, the data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a conventional client data processing system and a conventional server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a conventional computer, such as classical processing system 104, server 106, or clients 110, 112, and 114 in FIG. 1, or another type of device in which computer usable program code or instructions implementing the processes may be located for the illustrative embodiments.

Data processing system 200 is also representative of a conventional data processing system or a configuration therein, in which computer usable program code or instructions implementing the processes of the illustrative embodiments may be located. Data processing system 200 is described as a computer only as an example, without being limited thereto. Implementations in the form of other devices may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. In another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system. The main memory 208 is manifested as a virtualized instance of all or some portion of main memory 208 that may be available in the host data processing system. The disk 226 is manifested as a virtualized instance of all or some portion of disk 226 that may be available in the host data processing system. The host data processing system in such cases is represented by data processing system 200.

Figure 3:
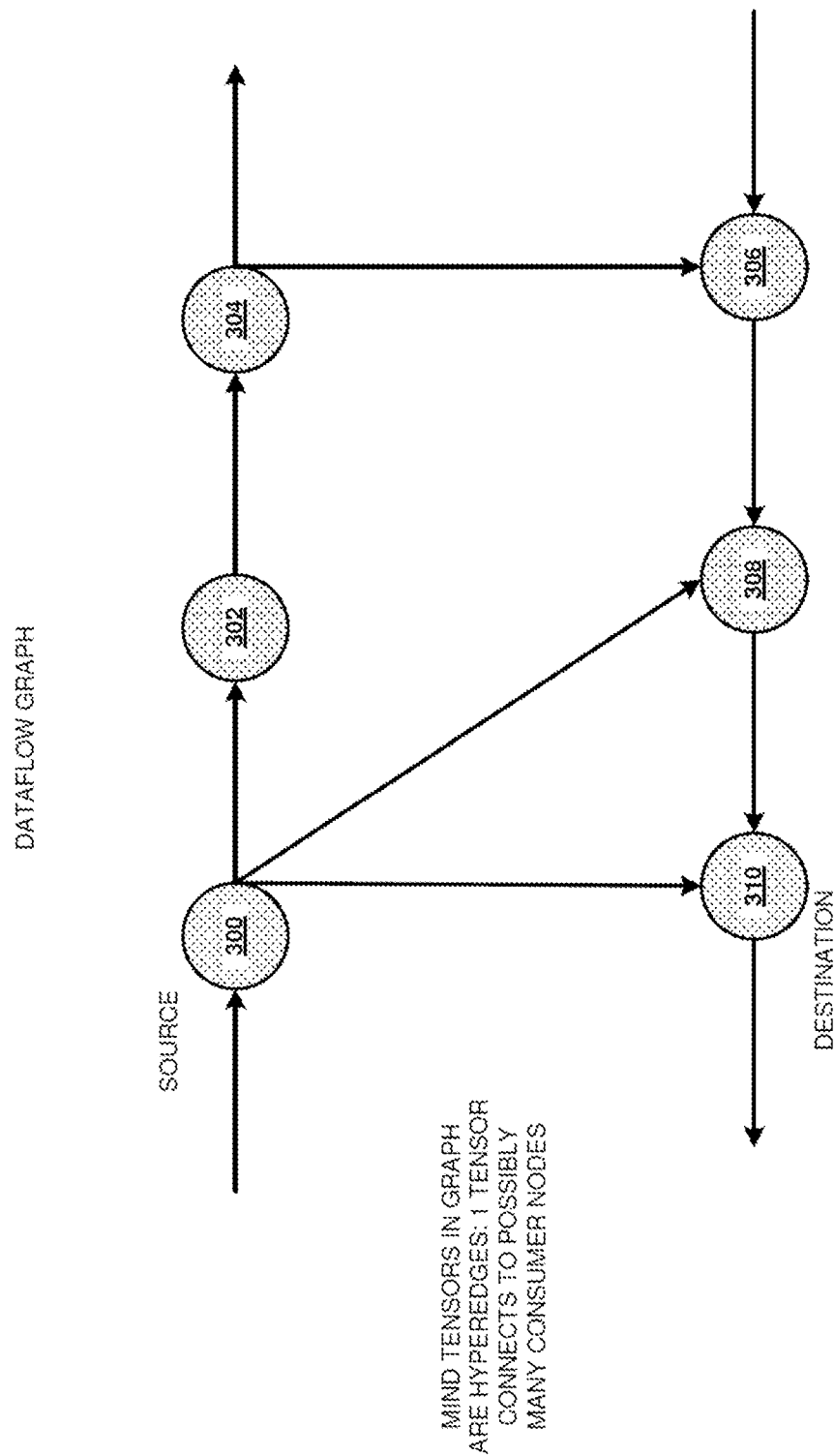
FIG. 3 depicts a data flow graph in accordance with an illustrative embodiment.

With reference to FIG. 3, this figure depicts a data flow graph with data transfer between nodes within the data processing system 200. FIG. 3 is depicted in the absence of memory savings modifications as proposed by this invention which will be described in later figures. The nodes depicted in FIG. 3 are some of the nodes that can be encountered in practice for neural networks. Still in other embodiments, a data flow graph can consist of over 1000 nodes or more. The nodes in FIG. 3, and in the remaining Figures to be described, take data items (tensors) as inputs and operate on that data to produce new data at their outputs. A node can execute whenever all of its input data is available. Nodes that produce output data have already executed accordingly. The source node 300 can receive data, and can transmit its output data to a plurality of nodes within the data processing system 200. For example, the source node 300 can transmit its output data to a second node 302. The second node 302 can also transmit its output data to a third node 304. Further, the third node 304 transmits its output data to a fourth node 306. The fourth node 306 can transmit its output data received from the third node 304 to a fifth node 308. The source node 300 also transmits its output data to the fifth node 308 and a destination node 310. The fifth node 308 also transmits its output data received from the fourth node 306 and the source node 300 to the destination node 310. The process of data transfer between the nodes in the data flow graph can repeat as necessary. The nodes transmitting data have completion times. Completion times refer to the time when the computation of the data is completed at the node, and available for the other nodes. Slack times refer to the amount of time that the arrival of a certain input could be delayed without causing the whole operation to be delayed, or how long the data is waiting at the input of the node until the data is used for the computation.

Figure 4:
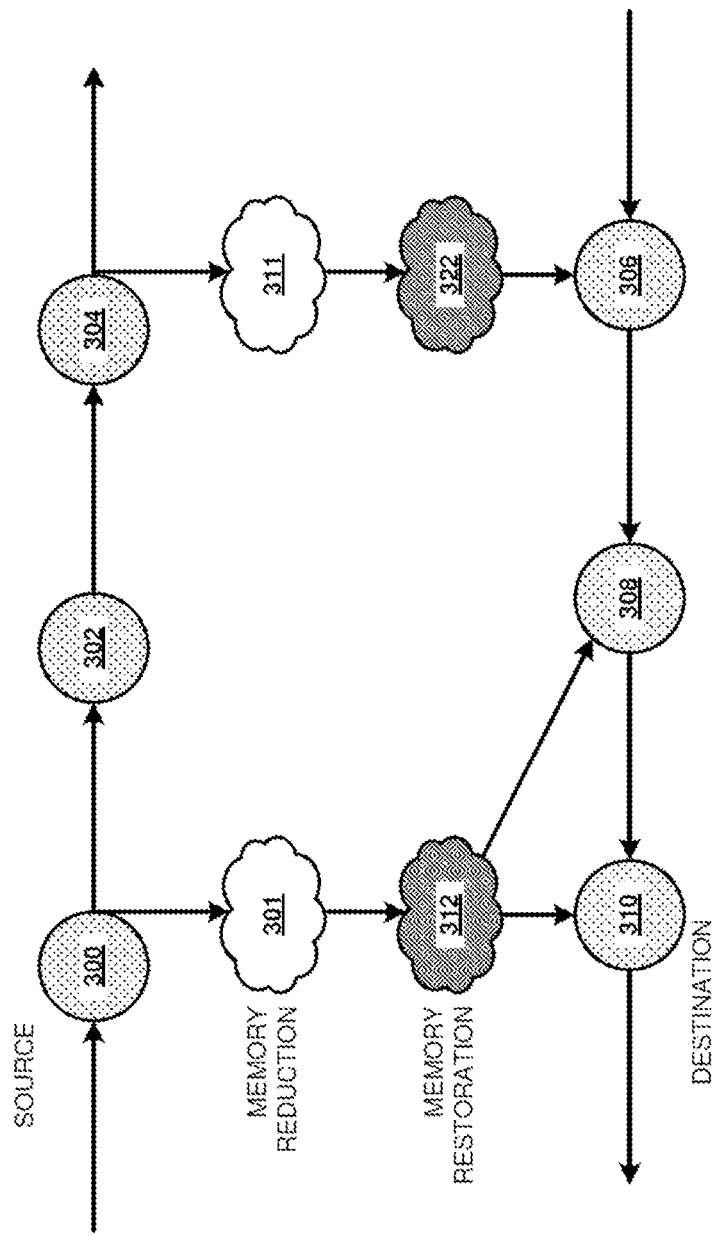
FIG. 4 depicts a data flow graph with a memory-reducing subgraph in accordance with an illustrative embodiment.

With reference to FIG. 4, this figure depicts a data flow graph with the similar configurations as FIG. 3. In addition, FIG. 4 introduces memory reduction and memory restoration subgraph insertions. GPUs within the data processing system 200 may often not have the required memory to perform certain computations or functions that require additional memory space. As a result, a GPU, for example can move data that takes up the required memory space to the CPU. The memory reduction node 301 illustrates the GPU transferring data to a CPU to perform the necessary functions or computations that require the additional memory space. The second node 302 can immediately execute after node 300 and thereby allocate memory space for its own output data while at the same time node 301 might be busy copying data to CPU memory. After node 301 completes its copying and frees up the memory held by its input tensor, nothing stops subgraph node(s) 312 from immediately starting its own memory restoration action and thus bringing the just saved data back from the CPU to the GPU.

Still with reference to FIG. 4, an identical series of events happens at the second invocation of a memory reduction/ restoration subgraph on the right-hand side of FIG. 4, involving the third node 304, subgraph nodes 311 and 322, fourth node 306. The third node 304 transmits its output data to the subgraph node(s) 311. The subgraph node(s) 311 moves the data to the subgraph node(s) 322. The subgraph node(s) 322 moves the data to a fourth node 306. The fourth node 306 transmits its output data to a fifth node 308. The fifth node 308 receives data from the subgraph node(s) 312. The fifth node 308 transmits its output data to destination node 310. In parallel execution, the subgraph node(s) 312 continues to move data to the destination node 310 as the fifth node 308 is transmitting its output data to the destination node 310.

Figure 5:
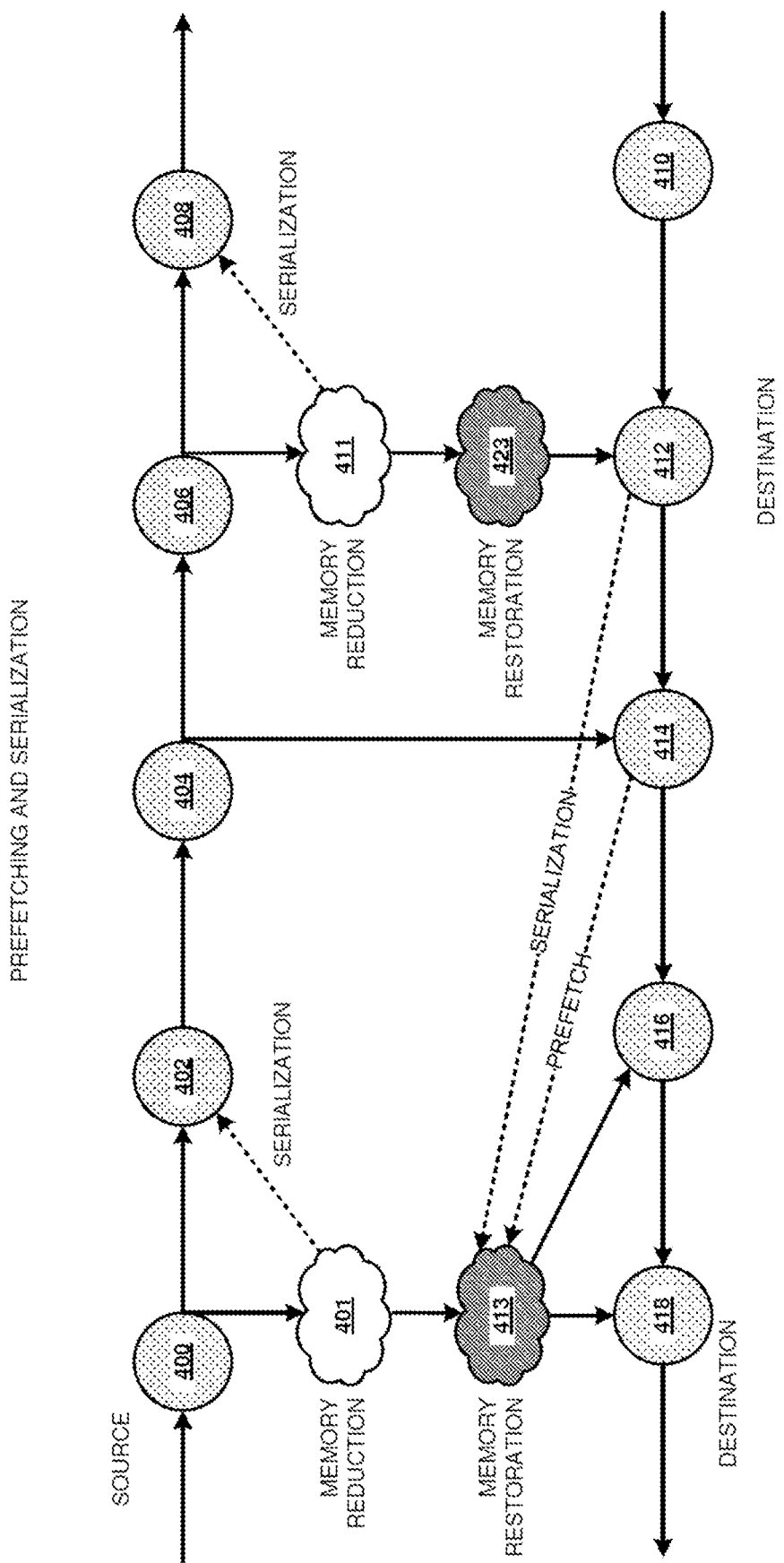
FIG. 5 depicts a data flow graph with Prefetching and Serialization in accordance with an illustrative embodiment.

With reference to FIG. 5, it has been determined that the usage of the data at nodes 416 and 418 is not pressing and therefore can be delayed by a memory reduction action represented by the subgraph node(s) 401. This action needs a counterpart in the form of a memory restoration action represented by the subgraph node(s) 413. One intention of the inserted subgraph, including subgraph nodes 401 and 413, is to relieve the GPU memory of the need to store the output tensor data of node 400 for a long time. Once node 402 consumes that tensor, it is not needed until node 416 is executed. There are three more additional provisions that form part of the inserted subgraph, namely the additional control dependency edges labeled with the words "SERIALIZATION" and "PREFETCH" represented in the data flow graph by the dashed arrows. The first one is an edge from subgraph node(s) 401 to node 402.

Still with reference to FIG. 5, the meaning of a control dependency edge from a node A to a node B is to make execution of node B dependent on node A. In an embodiment, node B must wait to start its operation until node A has completed its operation. As such, a control dependency edge can be regarded as a data output of a node A to the input of the dependent node B where no actual data gets transferred but a completion message is signaled instead. The reason to insert the control dependency edge from subgraph node(s) 401 to second node 402 is to ensure that execution of the node 402 is delayed until the memory reduction by subgraph node(s) 401 has completed. Otherwise, the node 402 would immediately execute after the source node 400 has executed and would allocate additional GPU memory for its own output tensor. This is avoided by the "SERIALIZATION" edge from subgraph node(s) 401 to node 402. The subgraph node(s) 401 and the node 402 are guaranteed to execute in series. The subgraph node(s) 401 will complete its execution before the node 402. The node 402 can transmit its output data to a node 404. The node 404 can transmit its output data to node 406 and node 414. Identical roles are played by subgraph node(s) 411 and node 408 as subgraph node(s) 401 and node 402.

Still with reference to FIG. 5, referring to the memory restoration node 413, without any further provisions to the contrary, it would immediately execute after subgraph node(s) 401 completes is execution. However, this would defeat the purpose of the memory reduction. In an embodiment, it may be mandatory to delay execution of subgraph node(s) 413 until the nodes that require the data as input (nodes 416 and 418) are ready to execute. A control dependency edge therefore is needed as input to subgraph node(s) 413 so that subgraph node(s) 413 awaits completion of a controlling node. The controlling node cannot be either nodes 416 or 418 because the additional dependency edge would create a cycle in the graph that cannot be allowed. The controlling node should be some node upstream from node 416. Node 410 transmits its output data to node 412. Node 412 transmits its output data to node 414. Node 414 is chosen accordingly to apply a "PREFETCH" edge onto subgraph node(s) 413. As soon as node 414 completes its operation it outputs its tensor to node 416 and at the same time signals subgraph node 413 via the "PREFETCH" edge that subgraph node 413 may start its restoration action. The initiation of the restoration action should be such that by the time it has completed, the node or nodes awaiting the restored data are ready to execute, meaning that data to other inputs of those nodes has already arrived.

With respect to FIG. 5, a third control dependency edge, the second to be labeled "SERIALIZATION" is depicted in FIG. 5 to run from node 412 to the subgraph node 413. It provides subgraph node 413 a second condition for the start of its restoration action. The purpose is to serialize subsequent restoration actions, which in this case involves the restoration action of subgraph nodes 423 and 413. Subgraph node(s) 423 restores a tensor that is consumed by node 412. As soon as node 412 completes its execution (and hence memory for its input tensors have been freed up), it allows subgraph node(s) 413 to start its execution but only if all its other inputs are available as well. Node 413 must wait a while longer for its "PREFETCH" signal to come from node 414. Once received, subgraph node(s) 413 restores its tensor and sends its data to nodes 416 and 418. Node 416 now has all its inputs available and hence executes producing the output tensor that node 418 needs as its input. Node 418 now also has its input data available and executes.

Still with reference to FIG. 5, the two control dependencies that are targeted to node 413 play distinct roles. The "PREFETCH" dependency ensures that subgraph node(s) 413 does not immediately restore the data that was reduced by node 401. There will be a delay until the nodes awaiting the restored data are ready at their other inputs. The "SERIALIZATION" dependency ensures that no two restorations occur at the same time, which can cause too much memory usage for all the restored tensors at the same time. In an illustrative embodiment, the "PREFETCH" signal can be said to dominate the "SERIALIZATION" signal because the "PREFETCH" is initiated later than the "SERIALIZATION." Still in other illustrative embodiments, the "SERIALIZATION can dominate the "PREFETCH" signal.

Figure 6:
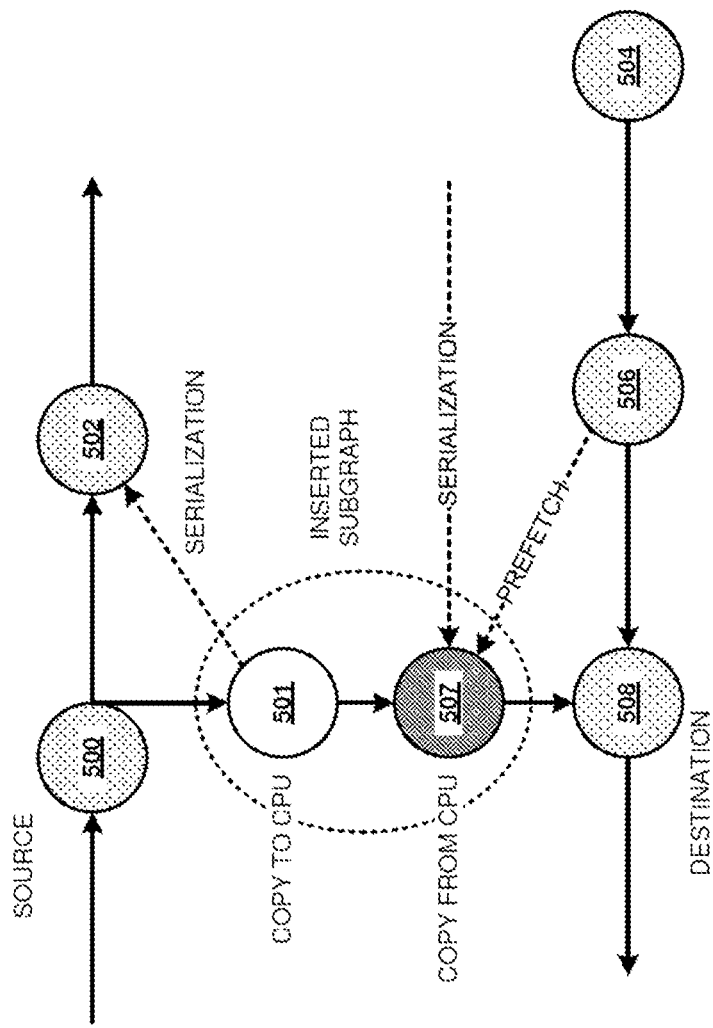
FIG. 6 depicts a data flow subgraph in accordance with an illustrative embodiment.

With reference to FIG. 6, an embodiment is depicted wherein a GPU moves data to a CPU to free up memory space to perform one or more functions or computations. Serialization and prefetching are utilized as in FIG. 5.

Still with respect to FIG. 6, a particular invocation of an inserted subgraph that takes care of the memory reduction and restoration actions is depicted. Here the memory reduction operation is represented by a single node whose operation is to copy its incoming tensor from GPU memory to CPU memory. The data that is swapped out of the GPU memory into the CPU memory can be a swap-out action. The GPU memory originally holding the data may now be freed after the action of copying has been completed. The node 501 representing this action has been labeled with "COPY TO CPU." The counterpart of this action is established by the restoration node 507 labeled with "COPY FROM CPU." Its purpose is to copy the tensor back from the CPU memory into GPU memory. Before the copying starts, GPU memory must be allocated to hold the restored tensor. Afterward, the CPU memory holding that tensor may be freed up.

With reference to FIG. 6, a source node 500 receives data and transmits the data to the node 501 and a second node 502. Memory reduction begins where the node 501, the controlling node, asserts a control dependency edge (illustrated "SERIALIZATION" with the dotted lines and arrow) onto the second node 502, or the dependent node. The second node's 502 execution must wait until node 501 completes its execution. The execution of node 501 and the second node 502 is serialized accordingly. The second node 502 transfers it output data to another node. Another node (not pictured) can apply a control dependency edge (illustrated by "SERIALIZATION") onto node 507 to ensure that the node 507 executes transmitting the data to be restored after the other node's execution of transmitting its output data. A third node 504 can transmit its output data to a fourth node 506. The fourth node 506 can apply a control dependency edge (illustrated by "PREFETCH") onto node 507. Accordingly, node 507 is delayed in transferring the data to be restored to the GPU until the fourth node 506 has transmitted its output data to the destination node 508. After the fourth node's 506 execution, node 507 transmits the data to the destination node 508.

Figure 7:
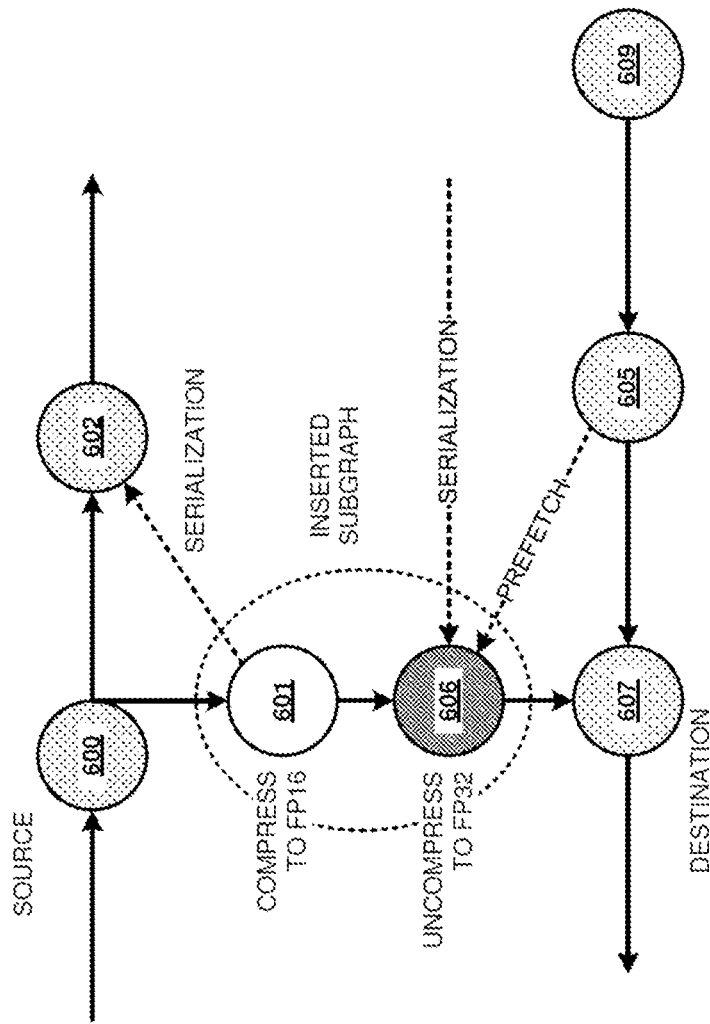
FIG. 7 depicts a data flow subgraph in accordance with an illustrative embodiment.

With reference to FIG. 7, another data flow graph illustrating data transfer and memory management is illustrated. A GPU may not just decide to move data to a CPU to free up the required memory space to perform one or more large functions or computations. The GPU also may decide to compress the data by a fraction (i.e., from 32 bits to 16 bits, from 32 bits to 8 bits, etc.) to obtain the necessary memory space without moving the data to a CPU. In other illustrative embodiments, the GPU can compress its data in various ways. In this illustrative embodiment, the GPU compresses data such as large tensors from 32-bit floating-point numbers to 16-bit floating-point numbers (refer to FIG. 11). In other words, the GPU can compress the data from 32 bits to 16 bits, and free up memory space to perform functions and/or computations.

Still with reference to FIG. 7, the source node 600 receives input data, and sends the data to the node 601 and a second node 602. The node 601 is the controlling node that applies the control dependency edge ("SERIALIZATION"), and the second node 602 is the dependent node. The second node 602 waits until the node 601 completes its execution. The second node 602 transmits its output data after the node 601 has compressed the data to free up memory space. Another node (not pictured) can assert a control dependency edge ("SERIALIZATION") on the node 606. The node 606 waits to decompress the data until the other node has completed its execution. The third node 609 receives data and transmits its output data to a fourth node 605. The fourth node 605 can assert a control dependency edge ("PREFETCH") on the subgraph node(s) 606. The node 606 waits to decompress and restore the data until the fourth node 605 has completed its own execution and transmitted its output data to the destination node 607. After the fourth node's 605 execution, the node 606 can complete its execution. The data can be decompressed and transmitted to the destination node 607.

Figure 8:
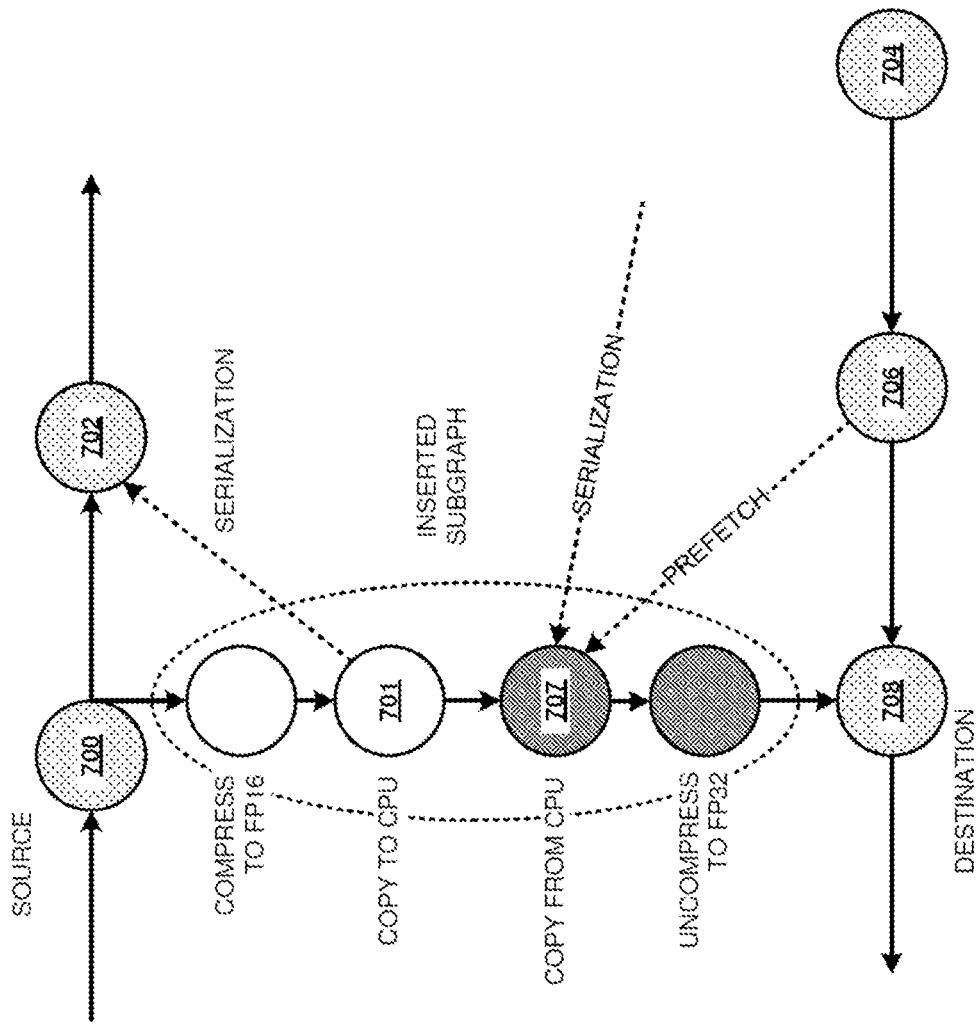
FIG. 8 depicts a data flow subgraph in accordance with an illustrative embodiment.

With respect to FIG. 8, the GPU can compress data and transfer the compressed data to the CPU to free up additional memory space. Memory reduction can occur to where the GPU compresses data and transmit the compressed data to the CPU before another node transmits its data to a next node. Memory restoration can occur in which the CPU is delayed from decompressing the data and transmitting the data back to the GPU until the destination node needs the data.

Still with respect to FIG. 8, the source node 700 receives data, and transmits the data to a node 701 and a second node 702. The node 701 applies a control dependency edge onto the second node 702. The second node's 702 execution must wait until the node 701 has compressed data, and transmitted the compressed the data and has copied the compressed data to the CPU. Node 707 is part of the restoration structure. The execution of the subgraph node(s) 701 and the second node 702 is serialized accordingly. The GPU can use the additional memory space to perform one or more functions or computations. The second node 702 can transmit its output data to a next node (not pictured). A node (not pictured) can apply a control dependency edge onto the node 707 which contains the compressed data on the CPU. In an embodiment, node 707 must wait to copy the compressed data back to the GPU until the control dependency is activated by the other node. The node 707 completes its execution of copying the compressed data back to the GPU after the other node's execution is complete.

With reference to FIG. 8, a third node 704 receives the data, and transmits its output data to a fourth node 706. The fourth node 706 executes a control dependency edge on the node 707. The node 707 waits to copy the data back and transmit the data to node labeled "UNCOMPRESS to FP32." As soon as both its control dependency inputs are satisfied, node 707 copies the data back from the CPU memory to GPU memory and transmits the data to be uncompressed. After decompression, the restored data is made available to the node 708.

Figure 9:
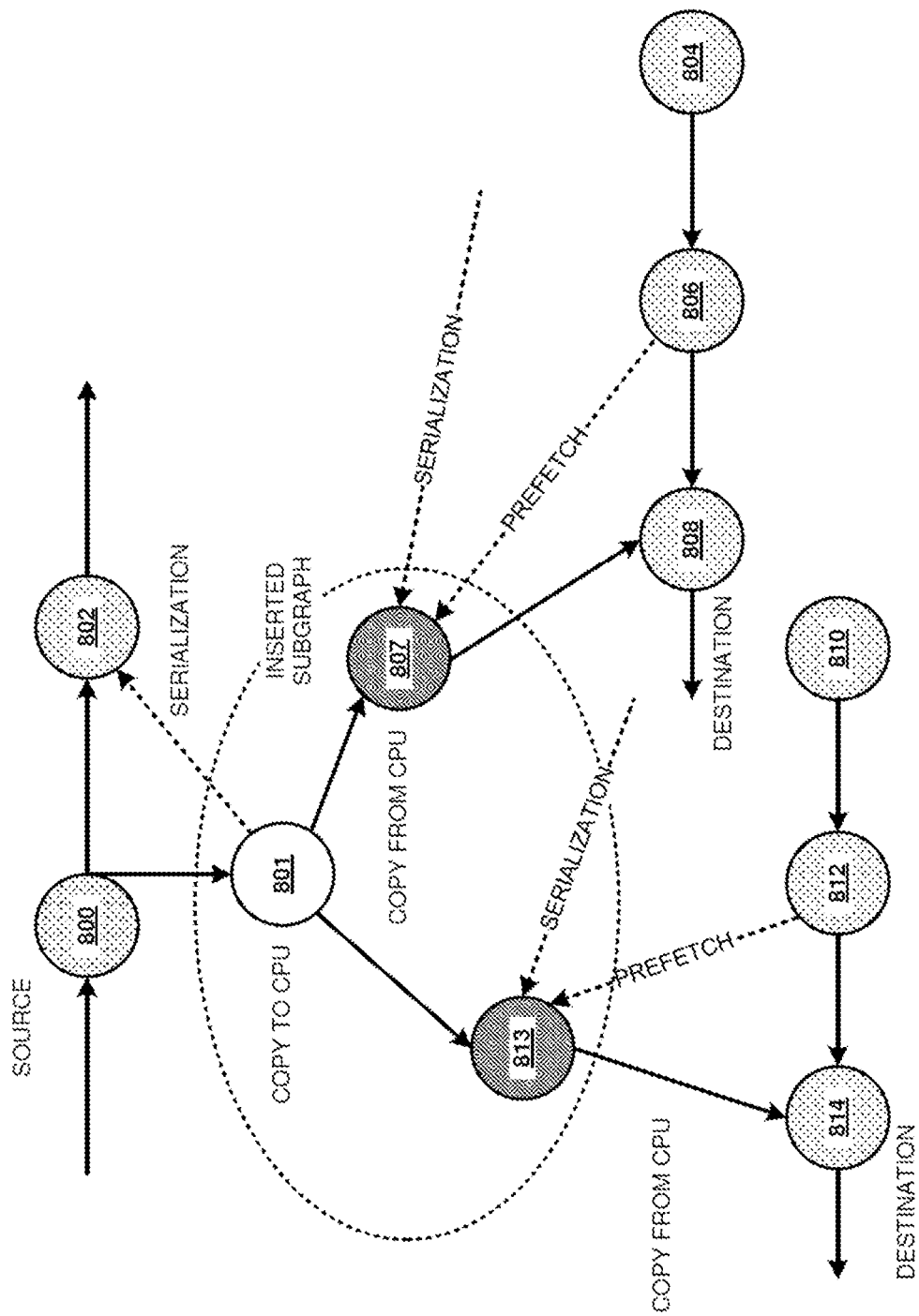
FIG. 9 depicts a data flow subgraph in accordance with an illustrative embodiment.

With respect to FIG. 9, situations can arise where the restoration action should be duplicated to satisfy different destination nodes. Although the memory reduction action represented by node 801 is singular, in this case experimental data establishes it to be beneficial to have two separate restoration actions of that data represented by nodes 813 and 807. In an illustrative embodiment, the GPU can retrieve the same data back from the CPU as many times as required to free up additional memory space to perform computations and/or other functions.

With reference to FIG. 9, a source node 800 transmits data to node 801 and a second node 802. Serialization is enforced by an addition of a control dependency edge from node 801 to the second node 802. Node 801 copies the data to CPU memory. The execution of node 801 and the second node 802 is serialized, wherein the second node 802 transmits its output data to a next node (not pictured) after the node 801 execution. The figure further depicts two instances of memory restoration subgraphs in the form of nodes 807 and 813. Both nodes 807, 813 each have two incoming control dependencies that establish the serialization and prefetching provisions as described in previous figures.

Still with reference to FIG. 9, a third node 804 receives data and transmits it output data to a fourth node 806. The fourth node 806 can apply a control dependency edge onto node 807. Node 807 waits to retrieve data from the CPU and transmit it to the destination node 808 until the fourth node 806 has completed its execution. Node 807 transmits the restored data to the destination node 808.

With respect to FIG. 9, an identical situation of restoration involves nodes 813, 814, 812, and 810. The same data stored in CPU memory by execution of node 801 is brought back to the GPU by node 813 as soon as it has its to control dependencies satisfied after the non-pictured node executes and signals the "SERIALIZATION" edge and also the node 812 execution signals the "PREFETCH" edge. The fifth node 810 can also receive data and transmit it output data to the sixth node 812. The sixth node 812 is the source of the "PREFETCH" control dependency to node 813. The restoration of CPU data to the GPU is delayed until execution of the sixth node 812 has completed. Accordingly, node 813 transmits the data to the destination node 814.

Figure 10A:
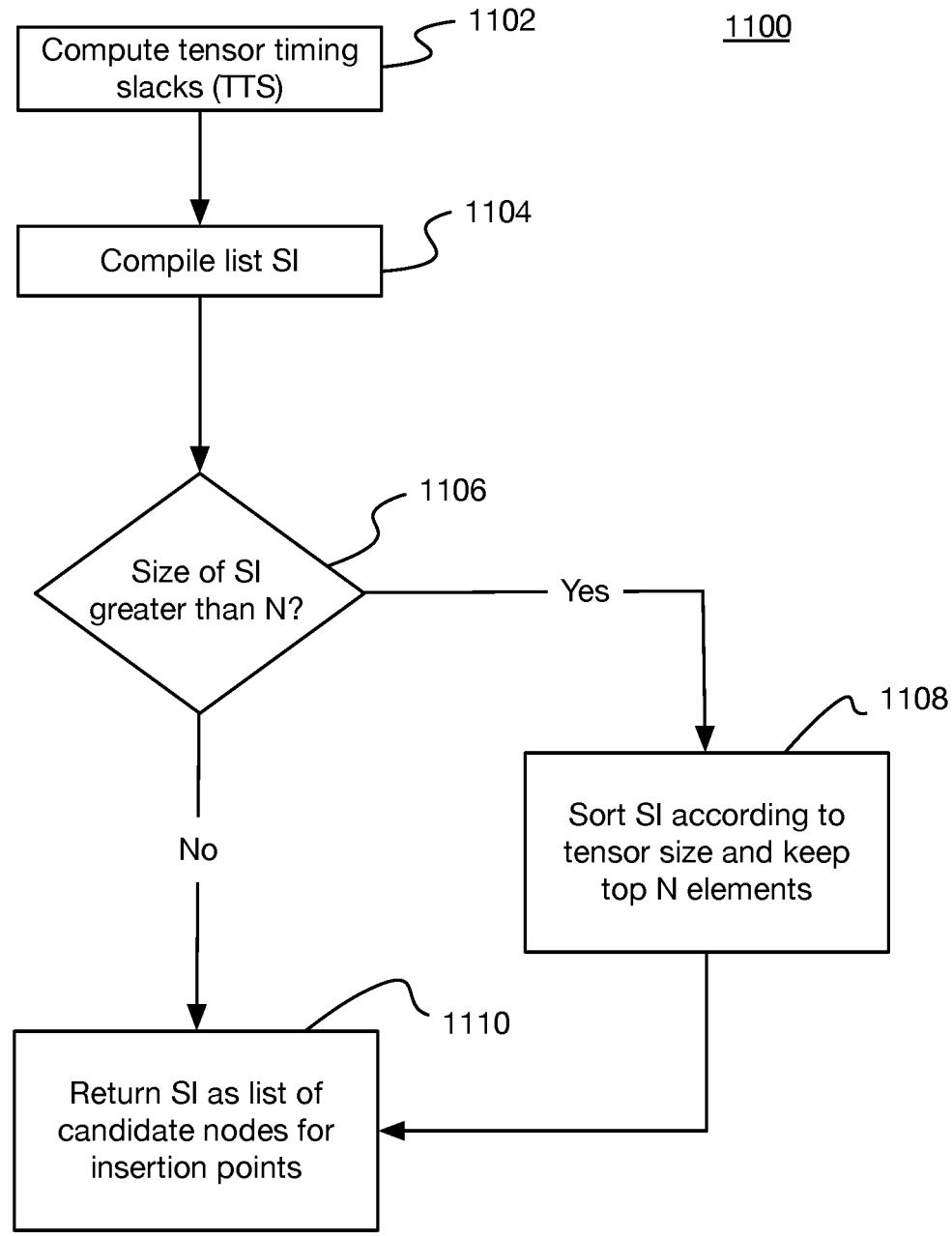
FIG. 10A depicts a flowchart of an example process for determining an insertion point for a reduction and restoration operation in accordance with an illustrative embodiment.

With respect to FIG. 10A, a flow diagram of an example process 1100 for determining an insertion point for a reduction and restoration operation is depicted. Method 1100 may be practiced by executing, using a processor, programming instructions stored on a tangible storage medium (for example, those described in connection with FIGS. 1 and 2).

In this embodiment, some user configurable information may be assumed. First, a threshold value thTTS may be defined for a tensor's timing slack (TTS); only tensors with slack values larger than the threshold value will be considered as candidates for insertion points. Second, a threshold value thS may be defined for tensor size; only tensors with a size (e.g., in bytes) larger than the threshold value will be considered as candidates for insertion points. Third, a maximum value N may be defined for the number of insertions to consider.

Based on these assumptions, at block 1102, tensor timing slacks (TTS) are computed for a set of input tensors (e.g., all input tensors of all data flow graph nodes) via timing analysis.

At block 1104, a candidate list SI is compiled of the input tensors of data flow graph nodes with TTS values larger than thTTS and with tensors whose size is larger than thS.

At decision block 1106, a determination is made as to whether the size of candidate list SI is greater than N.

At block 1108 (YES branch of decision block 1106), the candidate list SI is sorted according to tensor size, in descending order. Only the top N elements in the list are maintained in the list, and the additional tensors are removed from the candidate list SI. Other sorting or thresholding mechanisms may be used as well.

At block 1110 (either NO branch of decision block 1106 or completion of block 1108), the candidate list SI is returned as the list of candidate nodes for insertion points of a memory reduction or memory restoration operation in accordance with embodiments of the invention described in connection with other Figures.

Figure 10B:
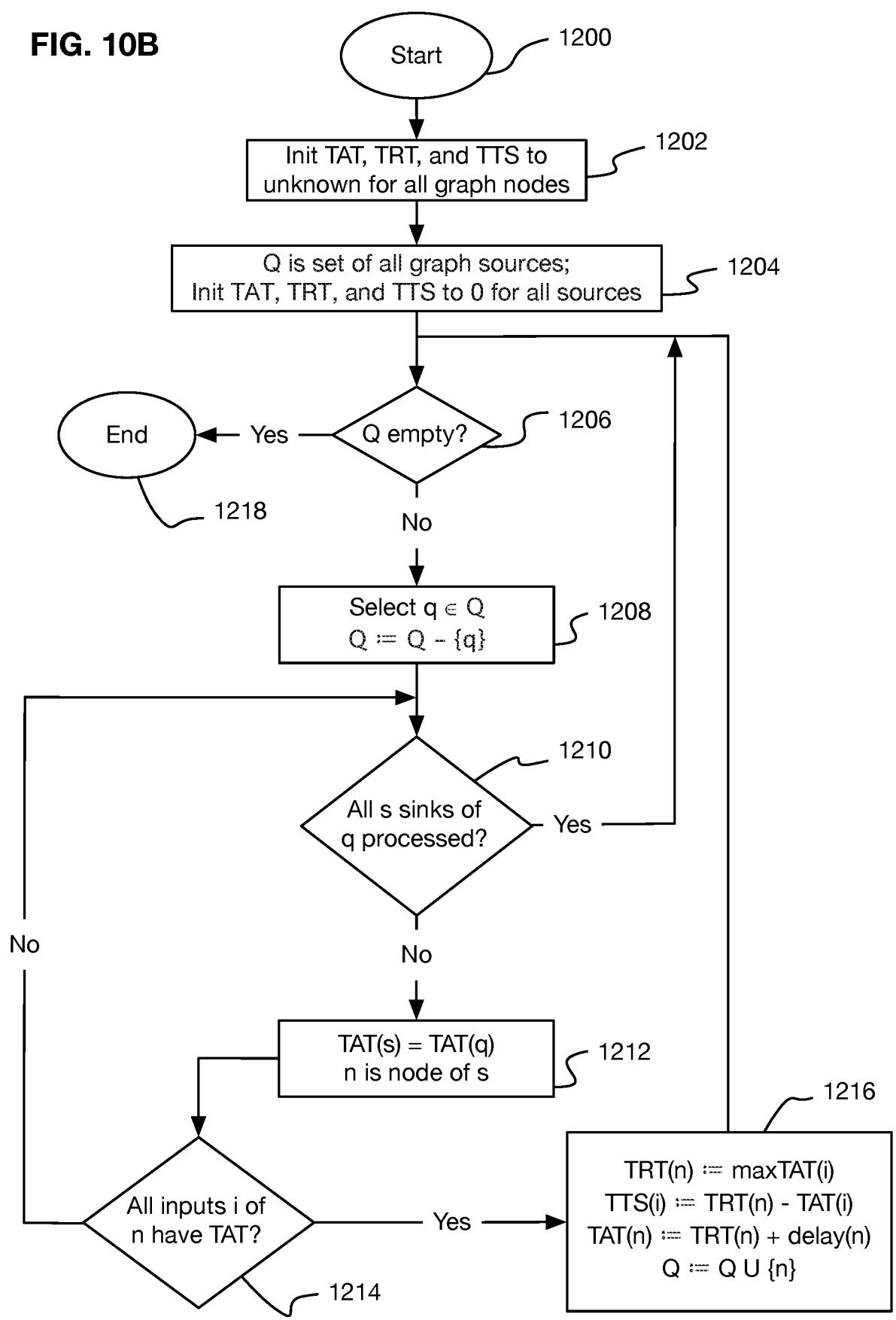
FIG. 10B depicts a flowchart of an example process for performing timing analysis in accordance with an illustrative embodiment.

With respect to FIG. 10B, a flow diagram of an example process 1200 for performing timing analysis is depicted. Method 1200 may be practiced by executing, using a processor, programming instructions stored on a tangible storage medium (for example, those described in connection with FIGS. 1 and 2).

Referring now to FIG. 10B, process 1200 starts according to the depicted embodiment. At step 1202, process 1200 initializes TAT, TRT, and TTS values to be unknown, for all data flow graph nodes. At step 1204, process 1200 defines a dataset Q, as follows: let Q be the set of all data flow graph source nodes. Process 1200 further sets TAT, TRT, and TTS values of elements of Q to be zero (0).

At step 1206, process 1200 checks whether Q is empty. If yes, the process ends (step 1218). However, if no e while Q is not empty), process 1200 selects (step 1208) an arbitrary element q of Q and excludes q from Q.

At step 1210, process 1200 determines whether all sink inputs s of q are processed. If yes, process 1200 considers the next q (check performed at step 1206). However, if no, process 1200 processes s as provided in step 1212, whereby process 1200 sets TAT of s to be equal to TAT of the node q. Process 1200 further defines (at step 1212) n to be the node to which node input s belongs. Process 1200 determines (step 1214) whether all inputs i of the node n have a known TAT value. If no, process 1200 considers the next s, and iterates as a while loop to process remainder sink inputs s of q, as identified at step 1210.

However, if yes (determination at step 1214), process 1200 proceeds to step 1216, where process 1200 sets TRT of node n as the maximum of the TATs of its inputs; sets TTS of each input I as the difference of n's TRT and the TAT of i, and sets TAT of node n as its TRT, incremented with the corresponding node delay; and includes n into Q.

Process 1200 ends (step 1218) when Q is empty (determined at step 1206), whereby TAT, TRT, and TTS values for all nodes have been deters lined through the steps described above.

In an embodiment, timing analysis as described in process 1200 traverses a data flow graph from its sources to sinks and computes TATs, TRTs and TSSs according to their definitions implemented by the process. This computation is performed in time-linear fashion in the size of the data flow graph.

Figure 11:
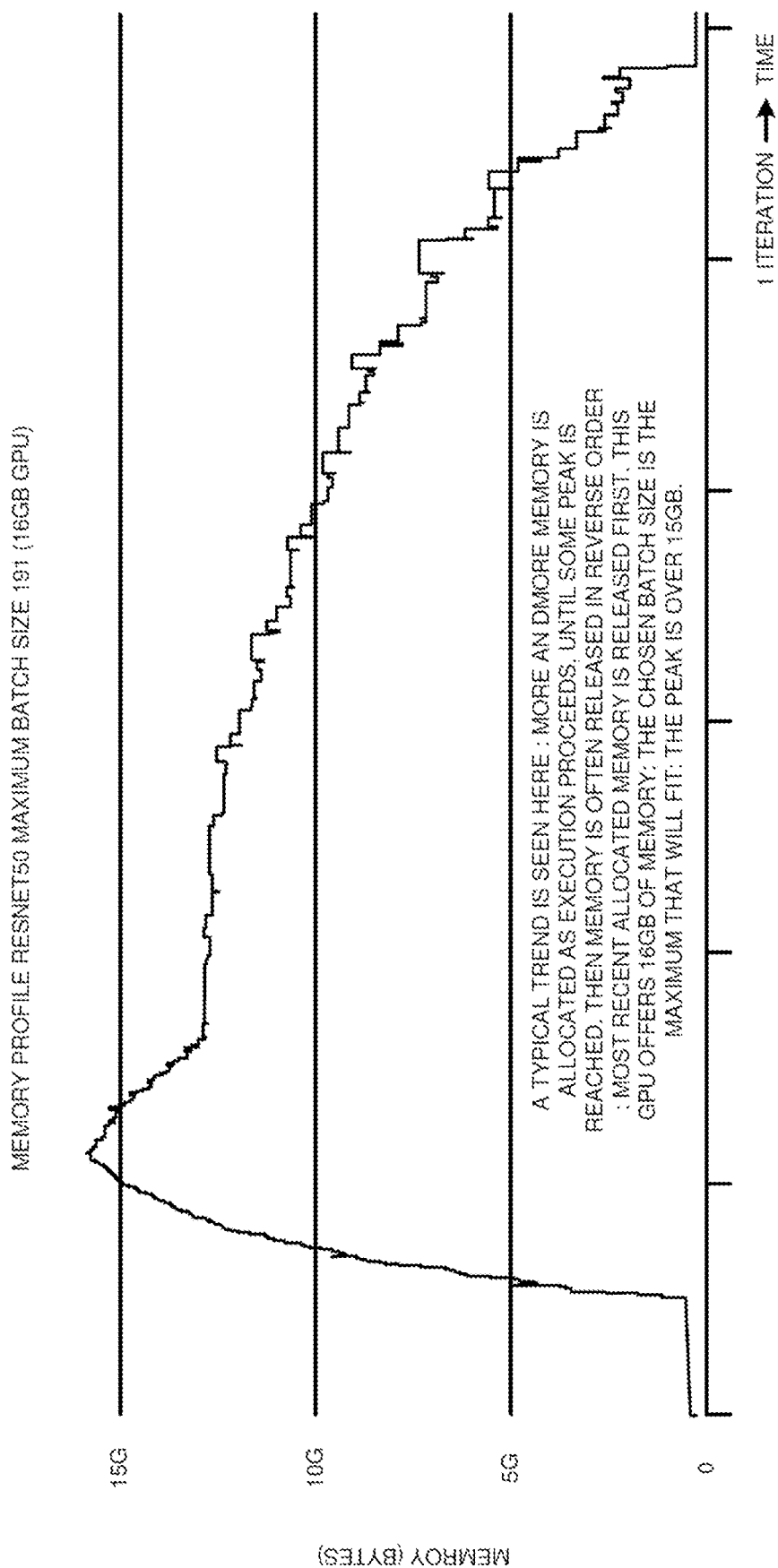
FIG. 11 depicts a memory profile graph in accordance with an illustrative embodiment.

Now with reference to FIG. 11, a memory profile graph of a GPU described in the illustrative embodiments above is depicted. A GPU in the illustrative embodiments has a memory of 16 gigabytes (GB). In other illustrative embodiments, the GPU can have a greater memory space. As the GPU is executing and performing functions and computations, more and more memory is allocated for the intended functions and computation until a peak is reached where no memory space remains. Once the peak is reached, memory is then released with the most recently allocated memory being released first.

Figure 12:
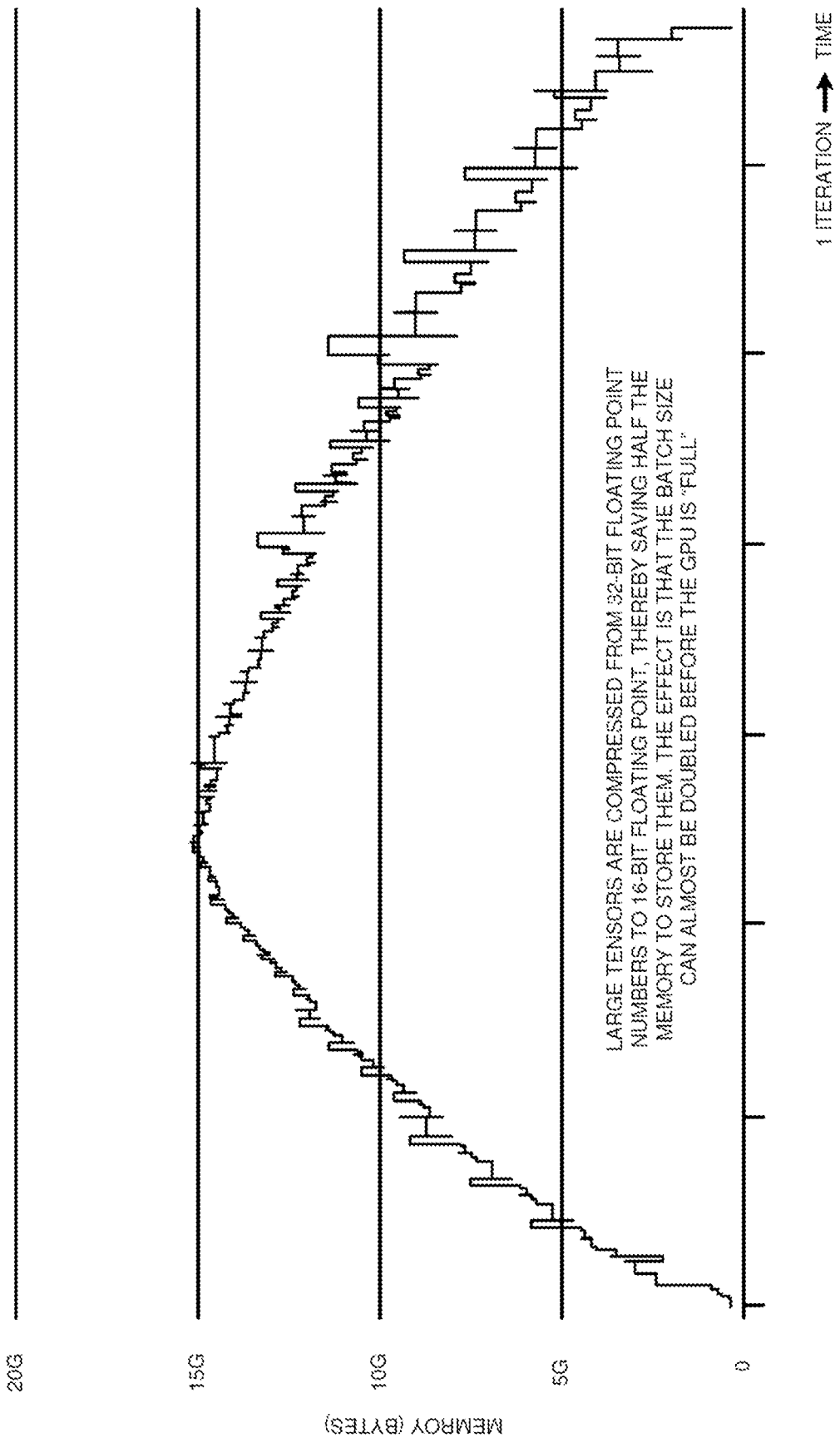
FIG. 12 depicts a memory profile graph in accordance with an illustrative embodiment.

With respect to FIG. 12, a memory profile graph of a GPU described in the illustrative embodiments above is depicted. When a GPU decides to compress the data within to create additional memory space, as shown above in FIGS. 7 and 8, the large data tensors within the GPU are compressed from 32-bit floating point numbers to 16-bit floating point numbers, or from 32 bits to 16 bits. As a result, half of the memory space becomes free, and the data batch size within the memory is doubled before the memory in the GPU reaches its peak.

Figure 13:
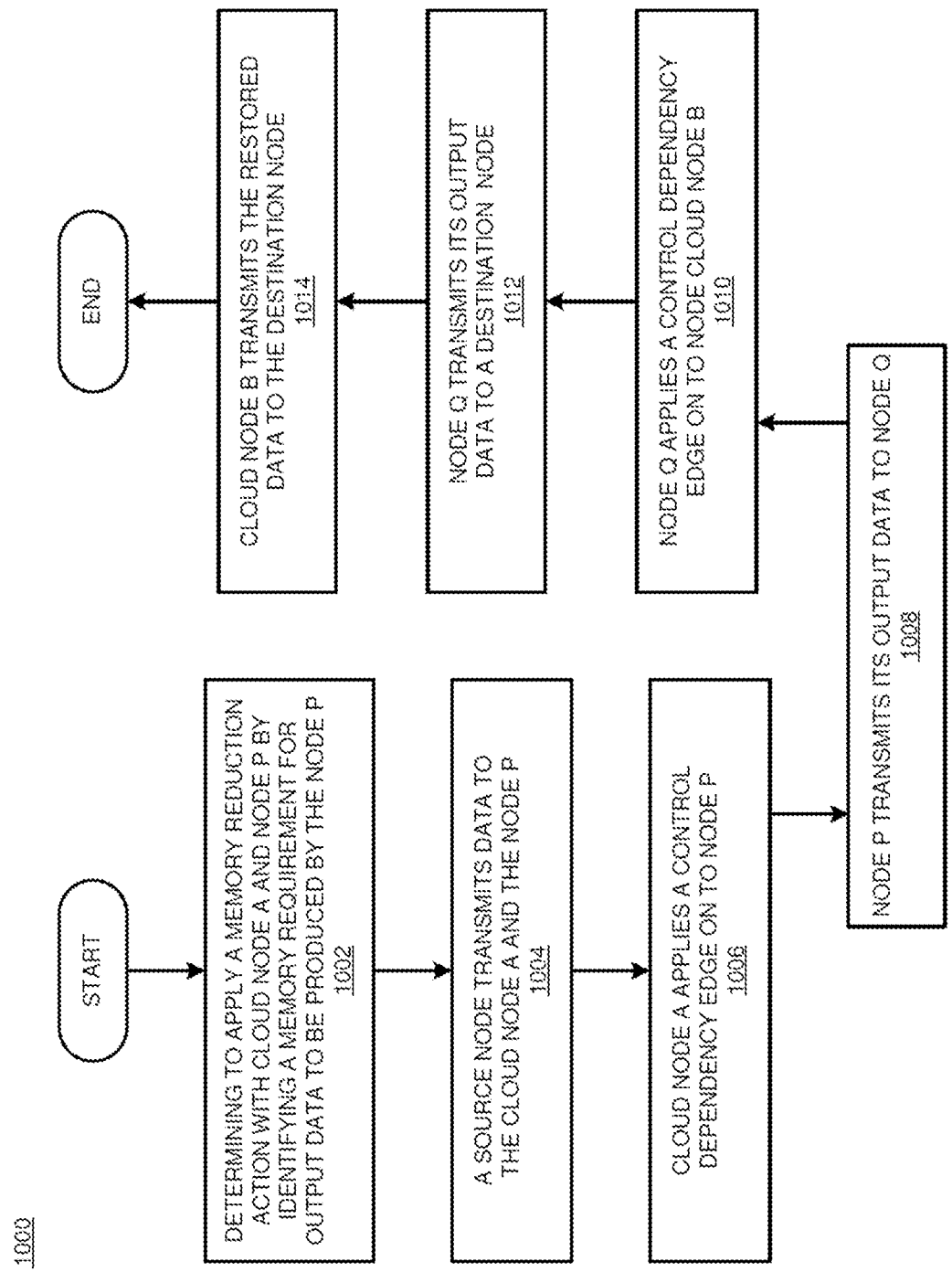
FIG. 13 depicts a flowchart of an example process for memory reduction in a graphical processor in accordance with an illustrative embodiment.

With respect to FIG. 13, a flow diagram of an example process 1000 for performing various functions according to an embodiment are depicted. At block 1002, a determination is made to apply a memory reduction action with subgraph node(s) A and node P by identifying a memory requirement for output data to be produced by node P (for example, in the context of FIG. 5, node A can refer to subgraph 401, and node P can refer to node 402). At block 1004, a source node transmits data to the subgraph node(s) A and the node P. At block 1006, the subgraph node(s) A applies a control dependency edge onto the node P. The execution of the subgraph node(s) A and the node P are serialized. The subgraph node(s) A executes before the node P. Here the subgraph node(s) A's operation is to copy its incoming tensor from GPU memory to CPU memory. The data that is swapped out of the GPU memory into the CPU memory can be a swap-out action. The GPU memory originally holding the data may now be freed after the action of copying has been completed. The GPU can use the additional memory space to perform one or more functions or computations. At block 1008, the node P transmits its output data to a node Q. At block 1010, the node Q applies a control dependency edge onto subgraph node(s) B. The control dependency edge ensures that subgraph node(s) B delays its memory restoration action until node Q has completed its execution. There will be a delay until the nodes awaiting the restored data are ready at their other inputs. At block 1012, the node Q transmits its output data to the destination node. Further, at block 1014, the subgraph node(s) B transmits the restored data to the destination node.

Some embodiments of the invention will now be described more generally. In the following description, one or more Figures may be referenced directly as needed, but the embodiments are to be understood as not limited to any specific Figure.

According to an embodiment of the invention, a method is provided for processing a neural network data flow graph comprising a set of nodes and a set of edges (for example, as defined above under Definitions 1-5). Steps of the method are performed as described, for example, in FIGS. 10A and 10B to generate a data flow graph or modify a data flow graph as described, for example, in connection with FIGS. 3-9. Steps of the method are stored on a tangible storage device (for example, as a computer program product) of a computer system, such as those described in connection with FIGS. 1-2.

The method computes tensor timing slacks (TTS) for a set of input tensors, compiling a candidate list (SI) of input tensors, from the set of input tensors, using input tensors having corresponding TTS values larger than a threshold value (thTTS), filtering the SI to retain input tensors whose size meets a threshold value (thS), and determining an insertion point for the operation using the SI based on the filtering.

According to an aspect of the method, the operation is a combination of a reduction operation and a restoration operation. The reduction operation comprises either or both of a copy to central processing unit (CPU) memory operation and a compression operation. The restoration operation comprises either or both of a copy from CPU memory operation and a decompression operation.

According to an aspect of the method, computing the TTS comprises performing timing analysis using the input tensors.

According to an aspect of the method, the timing analysis comprises:

initializing tensor arrival time (TAT), tensor required time (TRT), and tensor timing slack (TTS) values for the input tensors;

for a set of input tensors Q, while Q is not empty, performing steps of:

selecting a node q in Q for exclusion;

excluding q from Q; and setting, for each successor input tensor s of q, the TAT of s to be equal to TAT of q.

According to an aspect of the method, the initializing comprises:

initializing TAT, TRT, and TTS values to be of unknown value or to be zero.

According to an aspect of the method, all inputs of a node n have a known TAT value, wherein n is a node for which s is an input tensor, and wherein the method further comprises performing, for the set of input tensors Q, further steps of:

setting the TRT of n to be a maximum of the TATs of inputs s of n;

setting the TTS of each input i of n as a difference of n's TRT and the TAT of s;

setting the TAT of n based on n's TRT incremented by a node delay; and including n back into Q.

According to an aspect of the method, the data flow graph comprises a pair (N, E), wherein N comprises a set of nodes and E comprises a set of hyperedges, and wherein a given node in N implements one or more operators on one or more tensors.

According to an aspect of the method, the given node comprises a triplet (f, I, O), wherein f is a function of an operator implemented by the given node, I is a set of input tensors of the given node, and O is a set of outputs of the given node generated based on the operator.

According to an aspect of the method, a hyperedge defines how a tensor is passed from an operator that generates the tensor, to an operator that uses the tensor as an argument.

According to an aspect of the method, a hyperedge comprises a pair (s, H), wherein s is a node output, and H is a set of node inputs.

According to an aspect of the method, the method further comprises inserting in the data flow graph a subgraph node corresponding to the operation.

According to an aspect of the method, the inserting generates a new data flow graph or modifies an existing data flow graph.

According to an aspect of the method, the inserting generates a new data flow graph, wherein the new data flow graph comprises a complete data flow graph or a partial data flow graph.

According to an aspect of the method, the method further comprises:

processing the set of input tensors using the data flow graph based on the inserting; and generating outputs based on the processing.

According to an aspect of the method, the operation is a memory reduction operation, the method further comprising:

inserting a memory reduction subgraph node corresponding to the memory reduction operation.

According to an aspect of the method, the inserting further comprises:

connecting, via a first hyperedge, a first node to the memory reduction subgraph node, the first node corresponding to a source node; and connecting, via a second hyperedge, the memory reduction subgraph node to the second node, wherein the second hyperedge comprises a serialization hyperedge and the second node corresponds to an intermediary node or to a destination node.

According to an aspect of the method, the inserting further comprises:

connecting, via a third hyperedge, the first node to a second node.

According to an aspect of the method, the operation is a memory restoration operation, the method further comprising:

inserting a memory restoration subgraph node corresponding to the memory restoration operation.

According to an aspect of the method, the inserting further comprises:

connecting, via a first hyperedge, a first node to the memory restoration subgraph node, wherein the second hyperedge comprises a serialization hyperedge or a prefetching hyperedge;

connecting, via a second hyperedge, the memory restoration subgraph node to a second node, the second node corresponding to a destination node; and connecting, via a third hyperedge, a memory reduction subgraph node to the memory restoration subgraph node.

According to an aspect of the method, the method further comprises connecting two nodes of the data flow graph via a hyperedge, wherein the connecting comprises either of:

a direct connection via the hyperedge between the two nodes; and an indirect connection via one or more additional nodes and hyperedges between the two nodes.

According to an aspect of the method, steps of the method are performed iteratively to insert into the flow graph a set of subgraph nodes for performing at least one memory reduction operation and at least one memory restoration operation.

According to an aspect of the method, performing steps of the method iteratively comprises inserting a set of hyperedges in the flow graph, the set of hyperedges comprising at least one serialization hyperedge, or at least one prefetching hyperedge, or at least one serialization hyperedge and at least one prefetching hyperedge.

According to another embodiment of the invention, a method is provided. The method selects an insertion point in a data flow graph, for an operation, based on a set of tensor timing slacks (TTS) and a candidate list of input tensors (SI).

In an embodiment, the method further comprises:

computing the tensor timing slacks (TTS) for a set of input tensors;

compiling the candidate list (SI) of input tensors, from a set of input tensors, using input tensors having corresponding TTS values larger than a threshold value (thTTS);

filtering the SI to retain input tensors whose size meets a threshold value (thS); and determining an insertion point for a reduction and restoration operation using the SI based on the filtering.

In an embodiment, computing the TTS comprises performing timing analysis using the input tensors.

In an embodiment, the method further comprises inserting in the data flow graph a subgraph node corresponding to the operation.

In an embodiment, the inserting generates a new data flow graph or modifies an existing data flow graph.

In an embodiment inserting generates a new data flow graph, wherein the new data flow graph comprises a complete data flow graph or a partial data flow graph.

In an embodiment, the method further comprises:

processing the set of input tensors using the data flow graph based on the inserting; and generating outputs based on the processing.

According to an embodiment of the invention, a method is provided. The method comprises:

determining to apply a memory reduction action with subgraph node A and node P by identifying a memory requirement for output data to be produced by the node P;

transmitting data from a source node to the subgraph node A and the node P;

enabling the subgraph node A to perform the memory reduction action before an execution of the node P, the memory reduction action causing an additional memory space to become available for a graphical processor (GPU) to perform one or more functions;

causing subgraph node B to delay a memory restoration action until node Q has completed its execution; and transmitting the data from a central processor (CPU) of subgraph node B to the GPU to restore the data to the GPU.

In an embodiment, the method of further comprises applying a control dependency edge onto the node P to enable the subgraph node A to execute before the node P.

In an embodiment the method further comprises determining an insertion location for the control dependency edge by determining that node P that produces the output data with the memory requirement greater than output data produced by the node Q.

In an embodiment, the method comprises applying a control dependency edge onto the subgraph node B to delay the memory restoration action until the node Q has completed its execution.

In an embodiment, the method comprises delaying the execution of the node P until the memory reduction action is complete.

In an embodiment, the method comprises performing by the GPU, using the additional memory space, a series of computations.

In an embodiment, the method comprises transmitting the data from the subgraph node B to a destination node after the node Q completes its execution.

In an embodiment, the method comprises compressing the data to obtain the additional memory space for the GPU to perform the one or more functions.

In an embodiment, the method comprises decompressing the data before completing the memory restoration action.

In an embodiment, the method comprises delaying the memory restoration action until the data is needed by a destination node.

In an embodiment, the method comprises decompressing the data after the node Q has completed its execution.

In an embodiment, the method comprises restoring the data to the GPU after the node Q has completed is execution.

In an embodiment, the method comprises determining an insertion location to apply a control dependency edge to allow an additional memory restoration action to be performed.

In an embodiment, the method comprises performing the additional memory restoration action at a different time interval than the memory restoration action between the node Q and the subgraph node B.

In an embodiment, the method comprises:

compressing the data to create the additional memory space for the GPU to perform the one or more functions;

copying the compressed data to the CPU before the node P's execution;

transmitting the received data from the node P after the CPU receives the compressed data; and performing the one or more functions in the GPU using the additional memory space created.

In an embodiment, the method comprises determining a time interval needed to delay the memory restoration action to prevent the GPU from prematurely receiving the data back from the CPU.

According to another embodiment of the invention, a computer usable program product may be provided. The computer program product comprises one or more computer-readable storage devices, and program instructions stored on at least one of the one or more storage devices, the storage program instructions comprising program instructions to perform steps of a method according embodiments provided by this disclosure.

According to another embodiment of the invention, a computer may be provided. The system comprises one or more processors, one or more computer-readable memories, and one or more computer-readable storage devices, and program instructions stored on at least one of the one or more storage devices for execution by at least one of the one or more processors via at least one of the one or more memories, the storage program instructions comprising to perform steps of a method according embodiments provided by this disclosure.

In a data flow graph in illustrative embodiments, the tensors computed earlier occupy GPU memory until the other tensors needed for node execution are ready. The tensors computed too early can be either moved to large CPU memory, or compressed, or even deleted from the GPU memory. When those tensors are needed again, they are brought back to GPU memory, decompressed, or recomputed. The more tensors are involved in memory conservation, the greater the memory savings and the larger the data flow graph that can be processed in the same GPU memory.

In an embodiment, a method determines to apply a memory reduction action with subgraph node A and node P by identifying a memory requirement for output data to be produced by the node P. The method transmits data from a source node to the subgraph node A and the node P. The method enables the subgraph node A to perform the memory reduction action before an execution of the node P, the memory reduction action causing an additional memory space to become available for a graphical processor (GPU) to perform one or more functions. The method causes subgraph node B to delay a memory restoration action until node Q has completed its execution. The method transmits the data from a central processor (CPU) of subgraph node B to the GPU to restore the data to the GPU.

In an embodiment, the method applies a control dependency edge onto the node P to enable the subgraph node A to execute before the node P.

In an embodiment, the method determines an insertion location for the control dependency edge by determining that node P that produces the output data with the memory requirement greater than output data produced by the node Q.

In an embodiment, the method applies a control dependency edge onto the subgraph node B to delay the memory restoration action until the node Q has completed its execution.

In an embodiment, the method delays the execution of the node P until the memory reduction action is complete.

In an embodiment, the methods performs, by the GPU, using the additional memory space, a series of computations.

In an embodiment, the method transmits the data from the subgraph node B to a destination node after the node Q completes its execution.

In an embodiment, the method compresses the data to obtain the additional memory space for the GPU to perform the one or more functions.

In an embodiment, the method decompresses the data before completing the memory restoration action.

In an embodiment, the method the method delays the memory restoration action until the data is needed by a destination node.

In an embodiment, the method the method decompresses the data after the node Q has completed its execution.

In an embodiment, the method restores the data to the GPU after the node Q has completed is execution.

In an embodiment, the method determines an insertion location to apply a control dependency edge to allow an additional memory restoration action to be performed.

In an embodiment, the method performs the additional memory restoration action at a different time interval than the memory restoration action between the node Q and the subgraph node B.

In an embodiment, the method compresses the data to create the additional memory space for the GPU to perform the one or more functions. The method copies the compressed data to the CPU before the node P's execution. The method transmits the received data from the node P after the CPU receives the compressed data. The method performs the one or more functions in the GPU using the additional memory space created.

In an embodiment, the method determines a time interval needed to delay the memory restoration action to prevent the GPU from prematurely receiving the data back from the CPU.

In an embodiment, a computer usable program product is provided which comprises one or more computer-readable storage devices, and program instructions stored on at least one of the one or more storage devices. The storage program instructions comprise instructions to determine to apply a memory reduction action with subgraph node A and node P by identifying a memory requirement for output data to be produced by the node P; to transmit data from a source node to the subgraph node A and the node P; to enable the subgraph node A to perform the memory reduction action before an execution of the node P, the memory reduction action causing an additional memory space to become available for a graphical processor (GPU) to perform one or more functions; to cause subgraph node B to delay a memory restoration action until node Q has completed its execution; and to transmit the data from a central processor (CPU) of subgraph node B to the GPU to restore the data to the GPU.

In an embodiment, a computer system comprises one or more processors, one or more computer-readable memories, and one or more computer-readable storage devices, and program instructions stored on at least one of the one or more storage devices for execution by at least one of the one or more processors via at least one of the one or more memories. The storage program instructions comprise instructions to determine to apply a memory reduction action with subgraph node A and node P by identifying a memory requirement for output data to be produced by the node P; to transmit data from a source node to the subgraph node A and the node P; to enable the subgraph node A to perform a memory reduction action before an execution of the node P, the memory reduction action causing an additional memory space to become available for a graphical processor (GPU) to perform one or more functions; to cause subgraph node B to delay a memory restoration action until node Q has completed its execution; and to transmit the data from a central processor (CPU) of subgraph node B to the GPU to restore the data to the GPU.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented methods are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure.

The present invention may be a method, apparatus and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for reducing overall GPU memory usage while processing neural networks, the method comprising:
    automatically determining insertion points of memory conservation operations in an underlying data flow graph comprising a set of nodes and a set of edges, wherein automatically determining insertion points further comprises:
        computing tensor timing slacks (TTS) for a set of input tensors by performing a timing analysis;
        compiling a candidate list (SI) of input tensors, from the set of input tensors, using input tensors having corresponding TTS values larger than a threshold value (thTTS);
        filtering the SI to retain input tensors whose size meets a threshold value (thS); and
        determining an insertion point for the operation using the SI based on the filtering.

2. The method of claim 1, wherein the operation is a combination of a reduction operation and a restoration operation,
    wherein the reduction operation comprises either or both of a copy to central processing unit (CPU) memory operation and a compression operation, and
    wherein the restoration operation comprises either or both of a copy from CPU memory operation and a decompression operation.

3. The method of claim 1, wherein the timing analysis comprises:

initializing tensor arrival time (TAT), tensor required time (TRT), and tensor timing slack (TTS) values for the input tensors;
for a set of input tensors Q, while Q is not empty, performing steps of:
selecting a node q in Q for exclusion;
excluding q from Q; and
setting, for each successor input tensor s of q, the TAT of s to be equal to TAT of q.

4. The method of claim 3, wherein the initializing comprises:
initializing TAT, TRT, and TTS values to be of unknown value for all graph nodes and to be zero for all graph inputs collected in Q.

5. The method of claim 3, wherein all inputs of a node n have a known TAT value, wherein n is a node for which s is an input tensor, and wherein the method further comprises performing, for the set of input tensors Q, further steps of:
setting the TRT of n to be a maximum of the TATs of inputs i of n;
setting the TTS of each input i of n as a difference of n's TRT and the TAT of i;
setting the TAT of n based on n's TRT incremented by a node delay; and
including n back into Q.

6. The method of claim 1, wherein the data flow graph comprises a pair (N, E), wherein N comprises a set of nodes and E comprises a set of hyperedges, and wherein a given node in N implements one or more operators on one or more tensors.

7. The method of claim 6, wherein the given node comprises a triplet (f, I, O), wherein f is a function of an operator implemented by the given node, I is a set of input tensors of the given node, and O is a set of outputs of the given node generated based on the operator.

8. The method of claim 6, wherein a hyperedge defines how a tensor is passed from an operator that generates the tensor, to an operator that uses the tensor as an argument.

9. The method of claim 6, wherein a hyperedge comprises a pair (s, H), wherein s is a node output, and H is a set of node inputs.

10. The method of claim 1, further comprising:
inserting in the data flow graph a subgraph node corresponding to the operation.

11. The method of claim 10, wherein the inserting generates a new data flow graph or modifies an existing data flow graph.

12. The method of claim 11, wherein the inserting generates a new data flow graph, wherein the new data flow graph comprises a complete data flow graph or a partial data flow graph.

13. The method of claim 10, further comprising:
processing the set of input tensors using the data flow graph based on the inserting; and
generating outputs based on the processing.

14. The method of claim 1, wherein the operation is a memory reduction operation, the method further comprising:
inserting a memory reduction subgraph node corresponding to the memory reduction operation.

15. The method of claim 10, wherein the inserting further comprises:
connecting, via a first hyperedge, a first node to the memory reduction subgraph node, the first node corresponding to a source node; and
connecting, via a second hyperedge, the memory reduction subgraph node to the second node, wherein the second hyperedge comprises a serialization hyperedge and the second node corresponds to an intermediary node or to a destination node.

16. The method of claim 10, wherein the inserting further comprises:
connecting, via a third hyperedge, the first node to a second node.

17. The method of claim 1, wherein the operation is a memory restoration operation, the method further comprising:
inserting a memory restoration subgraph node corresponding to the memory restoration operation.

18. The method of claim 17, wherein the inserting further comprises:
connecting, via a first hyperedge, a first node to the memory restoration subgraph node, wherein the second hyperedge comprises a serialization hyperedge or a prefetching hyperedge;
connecting, via a second hyperedge, the memory restoration subgraph node to a second node, the second node corresponding to a destination node; and
connecting, via a third hyperedge, a memory reduction subgraph node to the memory restoration subgraph node.

19. The method of claim 1, further comprising connecting two nodes of the data flow graph via a hyperedge, wherein the connecting comprises either of:
a direct connection via the hyperedge between the two nodes; and
an indirect connection via one or more additional nodes and hyperedges between the two nodes.

20. The method of claim 1, wherein steps of the method are performed iteratively to insert into the flow graph a set of subgraph nodes for performing at least one memory reduction operation and at least one memory restoration operation.

21. The method of claim 20, wherein performing steps of the method iteratively comprises inserting a set of hyperedges in the flow graph, the set of hyperedges comprising at least one serialization hyperedge, or at least one prefetching hyperedge, or at least one serialization hyperedge and at least one prefetching hyperedge.

22. A computer system for memory management, comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
selecting an insertion point in a data flow graph, for an operation, based on a set of tensor timing slacks (TTS) and a candidate list of input tensors (SI);
computing the tensor timing slacks (TTS) for a set of input tensors;
compiling the candidate list (SI) of input tensors, from a set of input tensors, using input tensors having corresponding TTS values larger than a threshold value (thTTS);
filtering the SI to retain input tensors whose size meets a threshold value (thS); and
determining an insertion point for a reduction and restoration operation using the SI based on the filtering.

23. A method comprising:

determining to apply a memory reduction action with subgraph node A and node P by identifying a memory requirement for output data to be produced by the node P;

transmitting data from a source node to the subgraph node A and the node P;

enabling the subgraph node A to perform the memory reduction action before an execution of the node P, the memory reduction action causing an additional memory space to become available for a graphical processor (GPU) to perform one or more functions;

causing subgraph node B to delay a memory restoration action until node Q has completed its execution; and transmitting the data from a central processor (CPU) of subgraph node B to the GPU to restore the data to the GPU.

* * * * *